(12) United States Patent
Ishikawa et al.

(10) Patent No.: US 10,167,960 B2
(45) Date of Patent: Jan. 1, 2019

(54) FLUID CONTROL VALVE

(71) Applicant: CKD CORPORATION, Komaki-shi, Aichi (JP)

(72) Inventors: Shinji Ishikawa, Nisshin (JP); Michio Miyashita, Seto (JP); Hiroyuki Murase, Komaki (JP)

(73) Assignee: CKD CORPORATION, Komaki (JP)

( * ) Notice: Subject to any disclaimer, the term of this patent is extended or adjusted under 35 U.S.C. 154(b) by 126 days.

(21) Appl. No.: 14/956,094

(22) Filed: Dec. 1, 2015

(65) Prior Publication Data

US 2016/0169396 A1  Jun. 16, 2016

(30) Foreign Application Priority Data

Dec. 11, 2014  (JP) ................................ 2014-251320
Nov. 4, 2015  (JP) ................................ 2015-216461

(51) Int. Cl.
  *F16K 1/36*  (2006.01)
  *F16K 25/04*  (2006.01)
  (Continued)

(52) U.S. Cl.
  CPC .................. *F16K 1/34* (2013.01); *F16K 1/36* (2013.01); *F16K 1/42* (2013.01); *F16K 25/04* (2013.01); *F16K 41/103* (2013.01); *F16K 41/12* (2013.01)

(58) Field of Classification Search
  CPC ..... F16K 1/34; F16K 1/42; F16K 1/36; F16K 1/12; F16K 41/103; F16K 25/04
  (Continued)

(56) References Cited

U.S. PATENT DOCUMENTS 3,904,174 A * 9/1975 Giese ...................... F16K 3/246
                                                        251/251
7,201,187 B2 * 4/2007 Irwin ........................ F16K 7/17
                                                       137/625.28
(Continued)

FOREIGN PATENT DOCUMENTS

JP  2009-222189 A  10/2009
JP  2011-122718 A   6/2011
(Continued)

OTHER PUBLICATIONS

Apr. 18, 2017 Office Action issued in Japanese Patent Application No. 2015-216461.
(Continued)

*Primary Examiner* — Marina Tietjen
(74) *Attorney, Agent, or Firm* — Oliff PLC

(57) ABSTRACT

A fluid control valve includes: a drive section; body provided with first port, second port, and valve seat; and valve element formed columnar-shaped and coupled with the drive section, and the valve element includes annular sealing protrusion annularly protruding from end face located on side facing the valve seat, the sealing protrusion being provided at leading end with annular sealing portion to be pressed against the valve seat for sealing and at least the annular sealing protrusion is made of fluororesin. The valve element is configured such that the annular sealing portion is radially displaced with displacement amount of no more than 6.175 μm when the annular sealing portion is pressed against the valve seat by the drive section so that abrasion caused by deformation of the valve element in valve closing is restrained and generation of particles is prevented.

4 Claims, 33 Drawing Sheets

(51) Int. Cl.
*F16K 41/10* (2006.01)
*F16K 41/12* (2006.01)
*F16K 1/42* (2006.01)
*F16K 1/34* (2006.01)

(58) Field of Classification Search
USPC .............................. 251/331, 333–334, 335.2
See application file for complete search history.

(56) References Cited

U.S. PATENT DOCUMENTS

| | | | |
|---|---|---|---|
| 8,297,593 B2* | 10/2012 | Muzzo ...................... | F16K 1/02 |
| | | | 251/332 |
| 2003/0155024 A1* | 8/2003 | Hanada ................. | F16K 27/003 |
| | | | 137/861 |
| 2008/0099081 A1* | 5/2008 | Yamamoto ................ | F16K 1/36 |
| | | | 137/497 |
| 2015/0060716 A1* | 3/2015 | Picot ...................... | F16K 1/446 |
| | | | 251/334 |

FOREIGN PATENT DOCUMENTS

| JP | 2012-026476 A | 2/2012 |
|---|---|---|
| WO | 2014/133887 A1 | 9/2014 |

OTHER PUBLICATIONS

Aug. 1, 2018 Office Action issued in Chinese Patent Application No. 201510919192.0.

* cited by examiner

FIG. 3

| | (1) | (2) | (3) | (4) | (5) | (6) | (7) | (8) | (9) | (10) | (11) | (12) | (13) | (14) |
|---|---|---|---|---|---|---|---|---|---|---|---|---|---|---|
| | A | B | C | D | D/A | E | F | F/A | G | H | I | I/C | J | |
| COMP. EXAMPLE 1 | 5.0 | 0.1 | 0.5 | 6.0 | 1.20 | 0.00 | 3.7 | 0.74 | 2.65 | | | | 4.00 | NO |
| COMP. EXAMPLE 2 | 5.0 | 0.1 | 0.5 | 6.25 | 1.25 | 0.125 | 3.7 | 0.74 | 2.65 | | | | 4.00 | NO |
| COMP. EXAMPLE 3 | 5.0 | 0.1 | 0.5 | 7.5 | 1.50 | 0.75 | 3.0 | 0.60 | 2.65 | | | | 4.00 | NO |
| EXAMPLE 1 | 5.0 | 0.1 | 0.5 | 6.5 | 1.30 | 0.25 | 3.7 | 0.74 | 2.65 | 4.00 | 0.50 | 1.00 | 4.00 | YES |
| EXAMPLE 2 | 5.0 | 0.1 | 0.5 | 7.5 | 1.50 | 0.75 | 4.5 | 0.90 | 2.65 | | | | 4.00 | NO |
| EXAMPLE 3 | 5.0 | 0.1 | 0.5 | 8.5 | 1.70 | 1.25 | 5.4 | 1.08 | 2.65 | | | | 4.00 | NO |
| EXAMPLE 4 | 5.0 | 0.1 | 0.5 | 7.5 | 1.50 | 0.75 | 4.5 | 0.90 | 2.65 | 4.00 | 0.50 | 1.00 | 4.00 | YES |
| EXAMPLE 5 | 5.0 | 0.1 | 0.5 | 7.5 | 1.50 | 0.75 | 4.0 | 0.80 | 2.15 | 4.00 | 0.50 | 1.00 | 4.00 | YES |
| EXAMPLE 6 | 5.0 | 0.1 | 0.5 | 7.5 | 1.50 | 0.75 | 3.5 | 0.70 | 1.65 | 4.00 | 0.50 | 1.00 | 4.00 | YES |
| EXAMPLE 7 | 5.0 | 0.1 | 0.5 | 7.5 | 1.50 | 0.75 | 3.7 | 0.74 | 2.65 | | | | 4.00 | NO |
| EXAMPLE 8 | 5.0 | 0.1 | 0.5 | 7.5 | 1.50 | 0.75 | 4.5 | 0.90 | 2.65 | 4.00 | 0.40 | 0.80 | 4.00 | YES |
| EXAMPLE 9 | 5.0 | 0.1 | 0.5 | 7.5 | 1.50 | 0.75 | 4.5 | 0.90 | 2.65 | | 0.40 | 0.80 | 4.00 | NO |
| EXAMPLE 10 | 5.0 | 0.1 | 0.5 | 6.5 | 1.30 | 0.25 | 3.7 | 0.74 | 2.65 | | | | 4.00 | NO |
| EXAMPLE 11 | 5.0 | 0.1 | 0.5 | 6.5 | 1.30 | 0.25 | 3.7 | 0.74 | 2.65 | 4.00 | 0.35 | 0.70 | 4.00 | YES |
| EXAMPLE 12 | 5.0 | 0.1 | 0.5 | 6.5 | 1.30 | 0.25 | 3.7 | 0.74 | 2.65 | 4.00 | 0.30 | 0.60 | 4.00 | YES |
| EXAMPLE 13 | 5.0 | 0.1 | 0.5 | 6.5 | 1.30 | 0.25 | 3.7 | 0.74 | 2.65 | 2.00 | 0.50 | 1.00 | 4.00 | YES |

(1) WIDTHWISE MEAN DIAMETER  (2) RADIAL WIDTH OF ANNULAR SEALING SURFACE  (3) HEIGHT OF ANNULAR SEALING PROTRUSION
(4) END FACE DIAMETER  (5) DIAMETER RATIO  (6) RADIAL WIDTH  (7) THICKNESS OF MAIN PART  (8) THICKNESS RATIO
(9) HEIGHT FROM SEALING SURFACE TO COLUMNAR PART UPPER END  (10) DIAMETER OF PROTRUSION BASAL PART  (11) HEIGHT OF PROTRUSION
(12) PROTRUSION HEIGHT RATIO  (13) THIN PART DIAMETER  (14) ANNULAR GROOVE

FIG. 23

| | DISPLACEMENT AMOUNT OF ANNULAR SEALING SURFACE [μm] | RATIO TO DISPLACEMENT AMOUNT OF ANNULAR SEALING SURFACE IN EXAMPLE 10 [%] | RATIO OF DISPLACEMENT AMOUNT OF ANNULAR SEALING SURFACE TO WIDTHWISE MEAN DIAMETER A [$\times 10^{-4}$] | RATIO OF DISPLACEMENT AMOUNT OF ANNULAR SEALING SURFACE TO RADIAL WIDTH B [$\times 10^{-2}$] |
|---|---|---|---|---|
| COMP. EXAMPLE 1 | 9.428 | 153 | 18.90 | 9.43 |
| COMP. EXAMPLE 2 | 7.233 | 117 | 14.47 | 7.23 |
| COMP. EXAMPLE 3 | 6.449 | 104 | 12.90 | 6.45 |
| EXAMPLE 1 | 5.064 | 82 | 10.10 | 5.06 |
| EXAMPLE 2 | 4.037 | 65 | 8.07 | 4.04 |
| EXAMPLE 3 | 3.224 | 52 | 6.45 | 3.22 |
| EXAMPLE 4 | 3.687 | 60 | 7.37 | 3.69 |
| EXAMPLE 5 | 4.100 | 66 | 8.20 | 4.10 |
| EXAMPLE 6 | 4.685 | 76 | 9.37 | 4.69 |
| EXAMPLE 7 | 4.887 | 79 | 9.77 | 4.89 |
| EXAMPLE 8 | 3.736 | 61 | 7.47 | 3.74 |
| EXAMPLE 9 | 4.302 | 70 | 8.60 | 4.30 |
| EXAMPLE 10 | 6.175 | 100 | 12.40 | 6.18 |
| EXAMPLE 11 | 5.644 | 91 | 11.29 | 5.64 |
| EXAMPLE 12 | 5.678 | 92 | 11.36 | 5.68 |
| EXAMPLE 13 | 6.162 | 100 | 12.30 | 6.16 |

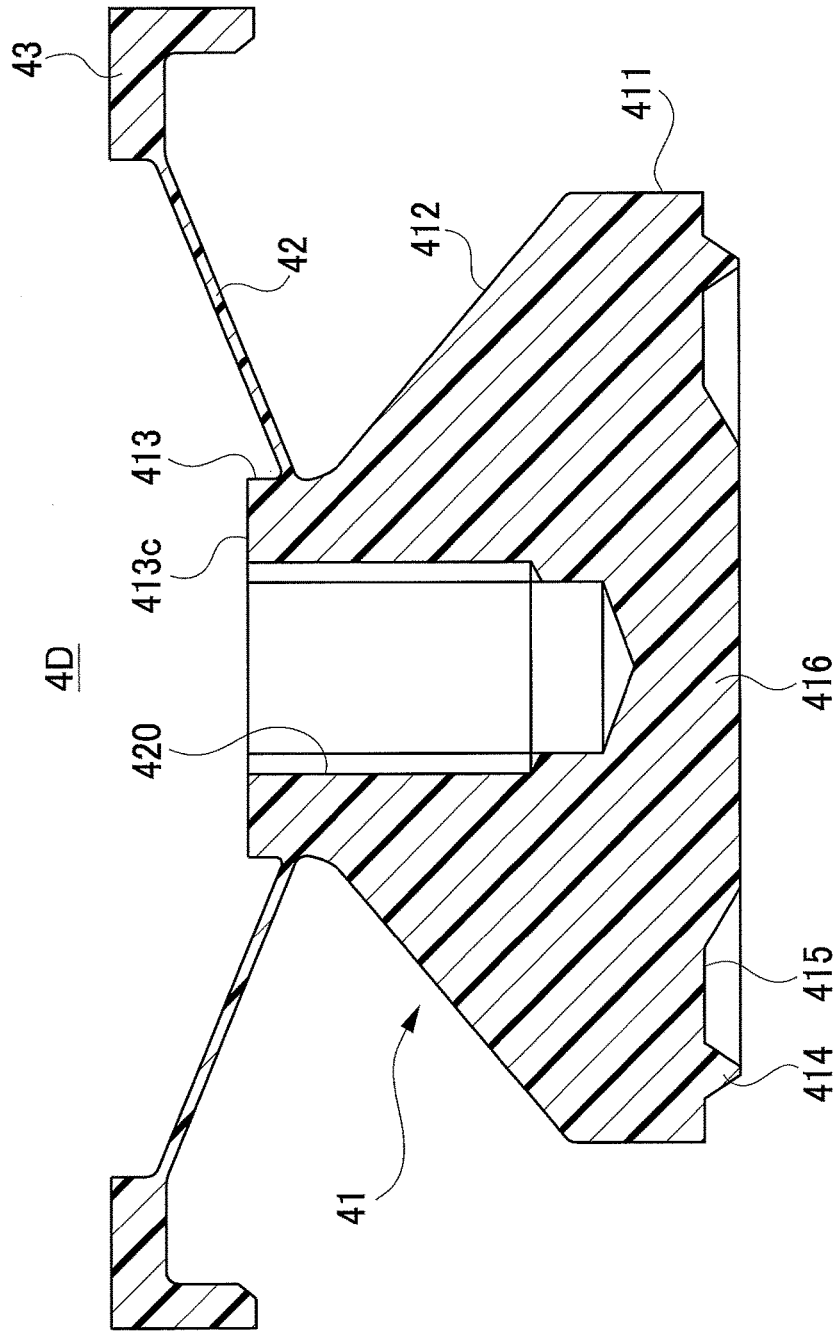

FLUID CONTROL VALVE

CROSS-REFERENCE TO RELATED APPLICATIONS

This application is based upon and claims the benefit of priority from the prior Japanese Patent Applications No. 2014-251320, filed Dec. 11, 2014, and No. 2015-216461, filed Nov. 4, 2015, the entire contents of which are incorporated herein by reference.

BACKGROUND OF THE INVENTION

Field of the Invention

The present invention relates to a fluid control valve to control a fluid.

Related Art

For instance, in a semiconductor manufacturing device, a fluid control valve is used to control a fluid by bringing a valve element into or out of contact with a valve seat. This type of fluid control valve includes liquid-contact portions such as a valve element and a valve seat which are made of resin for ensuring corrosion resistance. If resin particles get into a chemical liquid, a yield rate of products lowers. For that reason, a conventional fluid control valve is configured such that a valve seat has a valve seat surface, with which a valve element will contact, formed by being pressed by a heating member which is then separated from the seat surface, so that forming or molding defects of the valve seat surface are eliminated and generation of resin particles is prevented (see Patent Document 1, for example).

RELATED ART DOCUMENTS

Patent Documents

Patent Document 1: JP-A-2011-122718

SUMMARY OF INVENTION

Problems to be Solved by the Invention

A particle prevention measure for the conventional fluid control valve has been effective enough to reduce the influence on conventional semiconductor manufacturing. However, a semiconductor device has been downsized year by year. In association with this downsizing, finer particles than before may also influence on the semiconductor manufacturing. As downsizing of the semiconductor device advances, therefore, the finer particles also have to be reduced. A problematic size of such minute particles is for example 20 nm which can be measured by a commercially available particle counter.

The present invention has been made to solve the above problems and has a purpose to provide a fluid control valve enabling to restrain abrasion caused by deformation of a valve element which is caused in valve closing and to reduce generation of particles.

Means of Solving the Problems

To achieve the above purpose, one aspect of the invention provides a fluid control valve comprising: a drive section; a valve body provided with a first port, a second port, and a valve seat; and a valve element which is columnar-shaped and coupled with the drive section, wherein the valve element includes an annular sealing protrusion annularly protruding from an end face located on a side facing the valve seat, the sealing protrusion being provided at a leading end with an annular sealing portion which will be pressed against the valve seat for sealing, and at least the annular sealing protrusion is made of fluororesin, and the valve element is configured such that the annular sealing portion is displaced with a displacement amount of no more than 6.175 μm in a radial direction when the annular sealing portion is pressed against the valve seat by the drive section.

Another aspect of the invention provides a fluid control valve comprising: a drive section; a valve body provided with a first port, a second port, and a valve seat; and a valve element which is columnar-shaped and coupled with the drive section, wherein the valve element includes an annular sealing protrusion annularly protruding from an end face located on a side facing the valve seat, the sealing protrusion being provided at a leading end with an annular sealing portion which will be pressed against the valve seat for sealing and at least the annular sealing protrusion is made of fluororesin, and when the annular sealing portion is pressed on the valve seat by the drive section, a displacement amount of the annular sealing portion displaced in a radial direction is $12.4 \times 10^{-4}$ times or less than a diameter of the annular sealing portion when the annular sealing portion is out of contact with the valve seat.

Another aspect of the invention provides a fluid control valve comprising: a drive section; a valve body provided with a first port, a second port, and a valve seat; and a valve element which is columnar-shaped and coupled with the drive section, wherein the valve element includes an annular sealing protrusion annularly protruding from an end face located on a side facing the valve seat, the sealing protrusion being provided at a leading end with an annular sealing portion which will be pressed against the valve seat for sealing and at least the annular sealing protrusion is made of fluororesin, and a diameter of the end face is 1.3 times or more than a diameter of the annular sealing portion when the annular sealing portion is out of contact with the valve seat.

Effects of the Invention

According to the above aspects, there is provided a fluid control valve enabling to restrain abrasion caused by deformation of a valve element caused in valve closing and to reduce generation of particles.

BRIEF DESCRIPTION OF THE DRAWINGS

FIG. 3 is a table showing setting conditions of comparative examples 1 to 3 and examples 1 to 13;

FIG. 23 is a table showing a displacement amount of an annular sealing surface in each of the comparative examples 1 to 3 and examples 1 to 13, each ratio of a displacement amount of the annular sealing surface in each of the comparative examples 1 to 3 and examples 1 to 13 when a displacement amount of the annular sealing surface in the example 10 is assumed to be 100%, each ratio of the displacement amount of the annular sealing surface relative to a widthwise mean diameter, and each ratio of the displacement amount of the annular sealing surface relative to a width dimension;

FIG. 36 is a sectional view showing a valve element in a fifth modified example.

DESCRIPTION OF EMBODIMENTS

A detailed description of preferred embodiments of a fluid control valve embodying the present invention will now be given referring to the accompanying drawings.

A. First Embodiment (Overview of the Present Invention)

Figure 1:
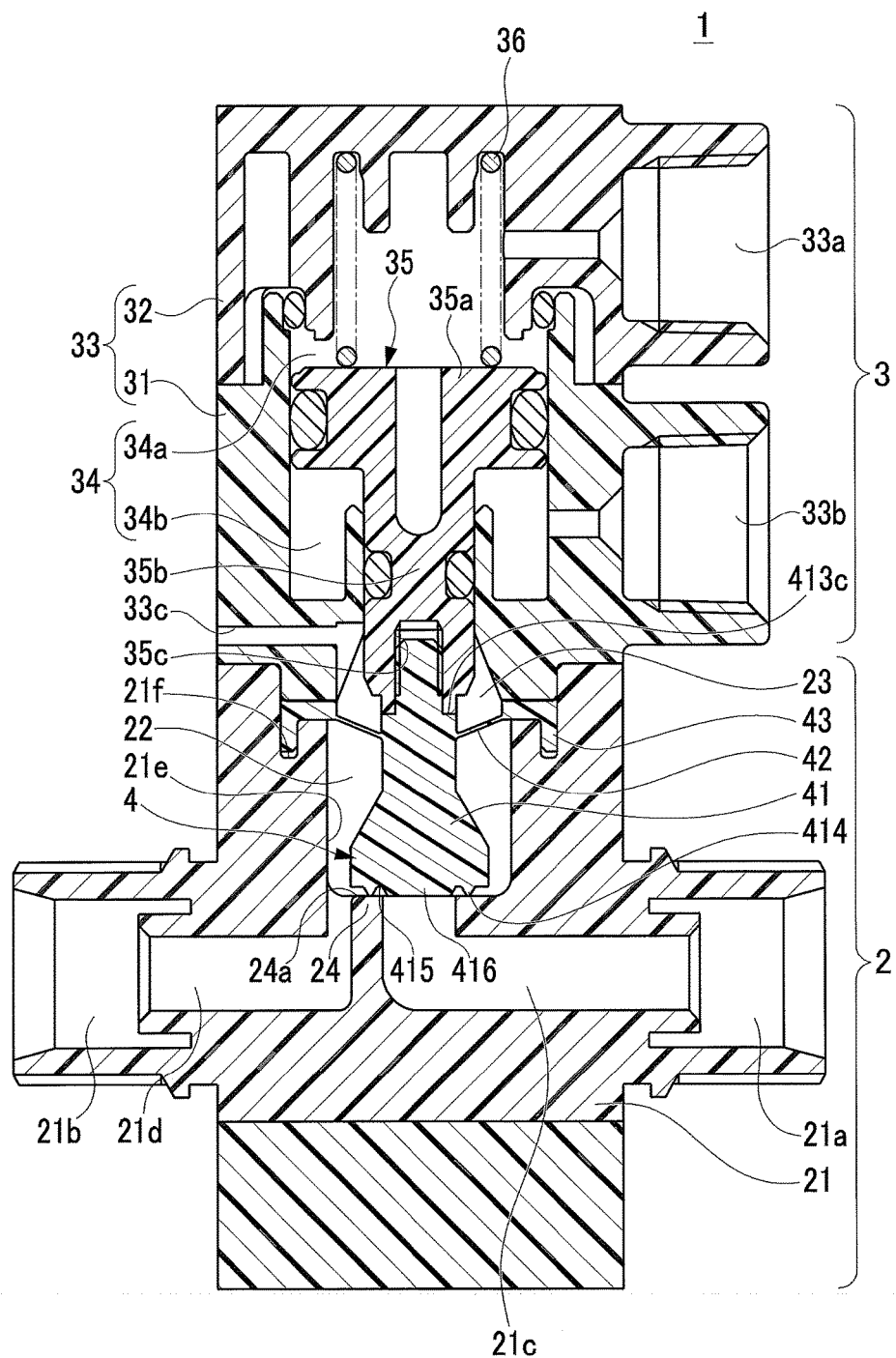
FIG. 1 is a sectional view of a fluid control valve in a valve closing state according to a first embodiment of the present invention.

FIG. 1 is a sectional view of a fluid control valve 1 in a valve-closing state according to a first embodiment of the present invention. The fluid control valve 1 of the first embodiment has a feature of reducing abrasion caused by deformation of a diaphragm valve element (one example of a valve element) 4 which is generated in valve closing.

For conventional diaphragm valves, various measures to prevent particles have been taken by, for example, bringing a valve element into a vertical contact with a valve seat, improving surface roughness of an annular sealing surface of the valve element and a valve seat surface of the valve seat, and others to improve a contact state between the annular sealing surface of the valve element and the valve seat surface of the valve seat and reduce a contact force therebetween. However, those measures were not enough to reduce the number of particles. Specifically, the size of a semiconductor device has been decreased year by year and accordingly the size of particles that may problematically affect semiconductor manufacturing also have become smaller. For instance, it has been demanded that a fluid control valve reduces as much as particles with a size of 20 nm which can be measured by a commercially available particle counter. As the problematic size of particles becomes smaller, the conventional way of reducing the number of particles further requires different prevention measures one after another, resulting in a vicious circle with a decrease in problematic size of particles. To address such a problem, the present inventors have noticed the necessity of removing a cause of generating particles and have found the fundamental cause of generating particles by repeatedly performing experiments and simulations (see effect confirmation test results which will be mentioned later).

Figure 30:
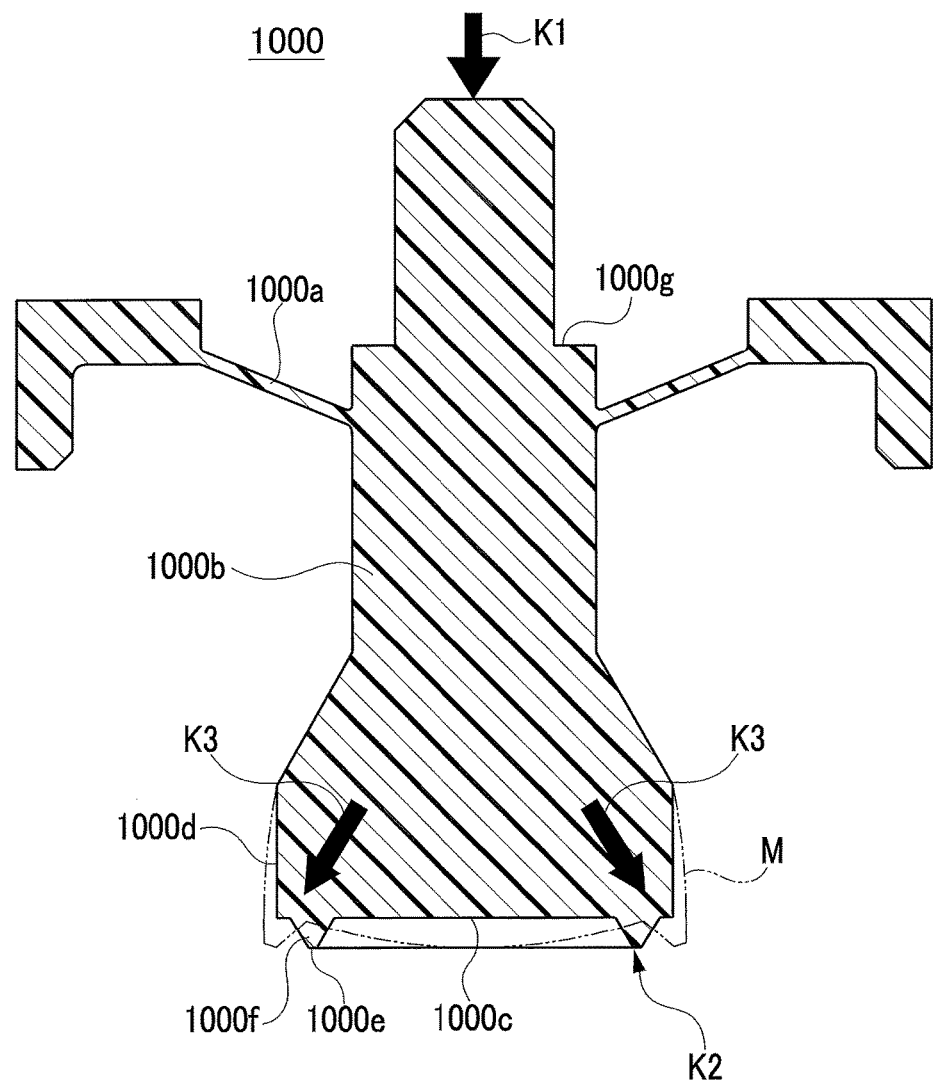
FIG. 30 is an image view for explaining elastic deformation of a diaphragm valve element.

FIG. 30 is an image view for explaining elastic deformation of a diaphragm valve element 1000. The diaphragm valve element 1000 includes a neck part (a small-diameter part) 1000b formed thin and connected with a web portion 1000a which extends radially outward therefrom. This diaphragm valve element 1000 can provide a larger volume of a diaphragm chamber in a fluid control valve accommodating the diaphragm valve element 1000, as compared with another fluid control valve of the same size, so that a flexible range of the web portion 1000a is widened to enable adjusting a pressure receiving area for receiving pressure from a fluid. The diaphragm valve element 1000 further includes a valve part 1000d provided coaxially with the neck part 1000b and designed with a larger diameter than the neck part 1000b. This valve part 1000d has an end face 1000c on the side facing a valve seat. This end face 1000c is formed with an annular sealing protrusion 1000f placed radially outside the neck part 1000b so that an opening portion of the valve seat has a large inner diameter (an orifice diameter), thereby enabling an increase in a flow rate to be controlled. The fluid control valve provided with this diaphragm valve element 1000 is operative to transmit the driving force applied to the neck part 1000b to an annular sealing surface 1000e of the annular sealing protrusion 1000f through the valve part 1000d, so that the annular sealing surface 1000e is brought into contact with the valve seat with a surface pressure of 3 to 50 MPa. In this diaphragm valve element 1000, a point of load (the point of application of force) K2, where the annular sealing surface 1000e comes into contact with the valve seat for sealing, is radially displaced outside a point of effort where the driving force is applied in a direction indicated with an arrow K1 in the figure. Therefore, every time the valve is operated to close, a force attempting to widen or move the annular sealing surface 1000e radially outwardly is generated as indicated with arrows K3 in the figure. In this case, as indicated with an imaginary line M in the figure, the annular sealing surface 1000e laterally slides with respect to the valve seat and hence the diaphragm valve element 1000 is deformed, so that the annular sealing surface 1000e rubs against the valve seat to cause abrasion. The present inventors assumed that such an abraded portion of the annular sealing surface 1000e would be torn or broken off from the annular sealing surface 1000e during the valve opening and closing operation, and the thus torn or broken pieces become particles. The present inventors backed up this assumption by simulations and experiments. The inventors have then devised a configuration of an annular sealing protrusion and its surroundings that can restrain or prevent deformation of a valve element.

(Schematic Configuration of Fluid Control Valve)

As shown in FIG. 1, the fluid control valve 1 includes a valve section 2 to control a fluid and a drive section 3 to apply a driving force to the valve section 2. The fluid control valve 1 is, for example, mounted in a semiconductor manufacturing device to regulate a flow rate of chemical liquid which will be supplied to a wafer. The fluid control valve 1 may control a chemical liquid with high corrosivity, and therefore the drive section 3 and the valve section 2 are partitioned by a diaphragm valve element 4.

The drive section 3 includes a cylinder 33 constituted of a cylinder body 31 and a cylinder cover 32. A piston 35 includes a piston body 35a slidably provided in a piston chamber 34 which is formed in the cylinder 33, the piston body 35a hermetically dividing the piston chamber 34 into a first chamber 34a and a second chamber 34b. The piston body 35a is integrally formed with a shaft 35b. A lower end part of the shaft 35b protrudes from the cylinder 33 into the valve section 2 and is coupled with the diaphragm valve element 4 in the valve section 2. A compression spring 36, which will apply a sealing load to the diaphragm valve element 4, is provided in the first chamber 34a in a contraction manner to continuously urge the piston 35 toward a valve seat 24 of the valve section 2. The cylinder 33 is formed with an intake and exhaust port 33a communicated with the first chamber 34a to admit and exhaust air, and an operation port 33b communicated with the second chamber 34b to supply operation air.

This drive section 3 drives the piston 35 to make a linear reciprocating motion in an axial direction by the balance between the spring force of the compression spring 36 and the inner pressure of the second chamber 34b to move the diaphragm valve element 4 by a predetermined stroke. Constituent members of drive section 3, except for the compression spring 36 and an annular sealing member, are made of fluororesin so that the drive section 3 can be used in highly corrosive atmosphere.

The valve section 2 placed in a valve body 21 is operative to perform fluid control by bringing an annular sealing protrusion 414 of the diaphragm valve element 4 into or out of contact with a valve seat surface 24a of the valve seat 24. The body 21 and the diaphragm valve element 4 are made of fluororesin for ensuring corrosion resistance. Further, for enhancing sealing property of the annular sealing protrusion 414, the diaphragm valve element 4 is preferably made of fluororesin having the same or lower hardness with the body 21 (the valve seat 24). In the present embodiment, the material of the body 21 (the valve seat 24) is PFA (tetrafluoroethylene perfluoroalkylvinyl ether copolymer) with a hardness of D 60 to D 64, and the material of the diaphragm valve element 4 is PTFE (polytetrafluoroethylene) with a hardness of D 53 to D 58.

The body 21 has a rectangular-parallelepiped shape formed with a first port 21a and a second port 21b individually opening at opposite side surfaces of the body 21 for inflow and outflow of a fluid. The upper face of the body 21 is formed with a cylindrical cavity 21e opening thereon and also a mounting groove 21f extending circumferentially around, or outside of, the cavity 21e. In the valve section 2, an outer peripheral edge portion 43 of the diaphragm valve element 4 is fitted in the mounting groove 21f of the body 21 and held between the body 21 and the cylinder 33, thus forming the diaphragm chamber 22 and a non-liquid-contact chamber 23. A main part 41 of the diaphragm valve element 4 is coupled with the shaft 35b to be movable inside the diaphragm chamber 22 in an upper and lower direction in the figure. The non-liquid-contact chamber 23 is communicated with a vent hole 33c formed in the cylinder 33 so that the web portion 42 is smoothly deformed in association with the motion of the main part 41.

A first communication passage 21c is formed in an L-shape in vertical section in the body 21 as shown in FIG. 1 to communicate the first port 21a with the diaphragm chamber 22 and is open in a center part of a bottom surface of the diaphragm chamber 22. On the bottom surface of the diaphragm chamber 22, the valve seat 24 is provided along an outer circumference of an opening of the first communication passage 21c. The valve seat 24 has the valve seat surface 24a formed as a flat surface orthogonally intersecting with an axis of the diaphragm chamber 22. The second communication passage 21d is formed in a reversed L-shape in vertical section to communicate the second port 21b with the diaphragm chamber 22 and is open outside the valve seat 24.

(Configuration of Valve Element)

Figure 2:
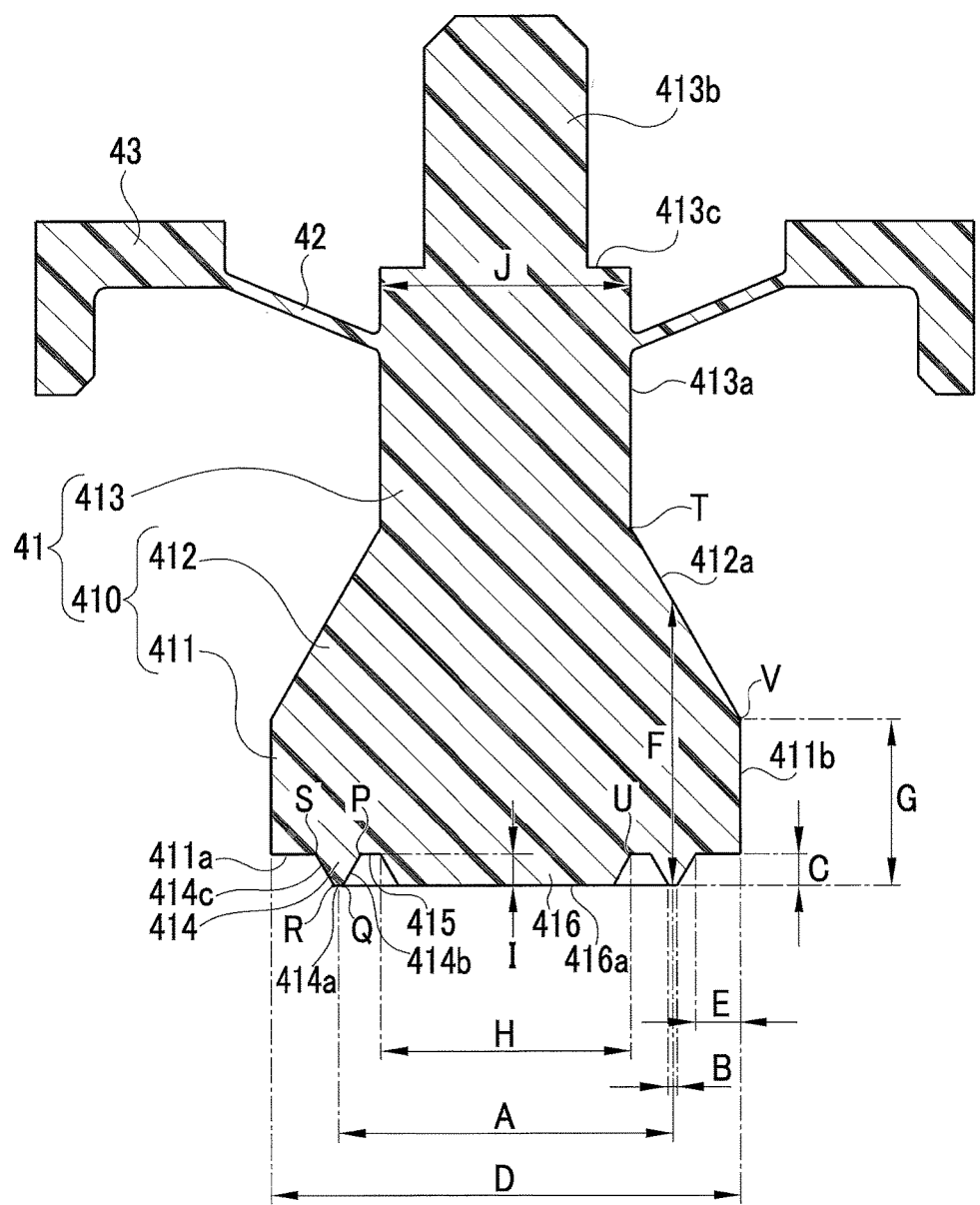
FIG. 2 is a sectional view of a valve element shown in FIG. 1.

FIG. 2 is a sectional view of the diaphragm valve element 4 shown in FIG. 1. The diaphragm valve element 4 is coupled its columnar main part 41 with the drive section 3 (see FIG. 1) so that the valve element 4 is brought into and out of contact with the valve seat 24. The web portion 42 is connected to an outer peripheral surface of the main part 41, and the outer peripheral edge portion 43 is formed along an outer peripheral edge of the web portion 42 with a thickness. The main part 41 is coaxially provided with a columnar part (a large-diameter part) 411, a shoulder part 412, and a neck part (a small-diameter part) 413. In the present embodiment, a valve part 410 is constituted by the columnar part 411 and the shoulder part 412.

The columnar part 411 is formed cylindrical and provided with an end face 411a on the side facing the valve seat 24. The neck part 413 has an outer peripheral surface 413a connected with the web portion 42 extending radially outward therefrom. The neck part 413 is designed to have a diameter smaller than the columnar part 411 in order to ensure the volume of the diaphragm chamber 22 (see FIG. 1). The neck part 413 is provided at the top thereof with a male threaded portion 413b threaded into a female threaded portion 35c (see FIG. 1) formed in and open at the bottom of the shaft 35b. The shoulder part 412 is provided joining the columnar part 411 and the neck part 413 and has a diameter decreasing from a side continuous with the columnar part 411 to a side continuous with the neck part 413 to prevent a fluid flowing in the diaphragm chamber 22 (see FIG. 1) from staying or generate turbulence therein. Further, the neck part 413 has a small diameter in order to lessen an outer diameter of the outer peripheral edge portion 43, thus downsizing the body 21.

On the end face 411a of the main part 41, the annular sealing protrusion 414 is provided to annularly protrude about an axis of the main part 41. The annular sealing protrusion 414 is formed outside a connection point T (hereinafter, referred to as a "point T") at which the outer peripheral surface 413a of the neck part 413 is connected with an outer peripheral surface 412a of the shoulder part 412. Therefore, the main part 41 can sealingly seat on the valve seat 24 through the annular sealing protrusion 414 located outside a position where the sealing load is applied, so that the main part 41 can provide a large area (volume) of a flow passage defined by the valve seat 24.

The annular sealing protrusion 414 has a predetermined height C from the end face 411a to a leading end of the annular sealing protrusion 414 so that the protrusion 414 is rigid enough to prevent buckling or breakage due to the sealing load. In the present embodiment, as shown in FIG. 2, the height C of the annular sealing protrusion 414 is set to be one tenth of the diameter of the annular sealing surface 414a (one example of an annular sealing portion) defined as a mean diameter between the outer diameter and the inner diameter of the annular sealing surface 414a in a diametrical or widthwise direction, i.e., a distance between widthwise center points of diametrically opposite portions of the surface 414a, when the protrusion 414 is in a non-contact state with the valve seat. This diameter of the annular sealing surface 414a is one example of a "diameter of an annular sealing portion", which is hereinafter also referred to as a "widthwise mean diameter A".

The annular sealing protrusion 414 is formed with a decreasing outer diameter from a side of the end face 411a to the leading end (a side close to the valve seat). Specifically, an inner peripheral surface 414b and an outer peripheral surface 414c of the annular sealing protrusion 414 are largely slanted and tapered from the end face 411a to the leading end. The annular sealing protrusion 414 has the annular sealing surface 414a at the leading end formed flat to orthogonally intersect with an axis of the main part 41. The thus configured annular sealing protrusion 414 can apply a high sealing load per unit area to the annular sealing surface 414a, thereby preventing liquid leakage and making it hard for the annular sealing surface 414a to slip on a valve seat surface 24a. Further, the drive section 3 can be made compact. A width dimension B in the radial direction of the annular sealing surface 414a (hereinafter, also referred to as a "radial width B") is preferably set to be equal to or more than one one-hundredth and equal to or less than one tenth of the widthwise mean diameter A of the annular sealing surface 414a.

The diaphragm valve element 4 is designed to be rigid so as to reduce a displacement amount of the annular sealing surface 414a that is displaced in a radial direction to no more than 6.175 μm when the valve element 4 is subjected to the sealing load. Thus, the annular sealing surface 414a hardly rubs against and abrades the valve seat 24 during valve closing. For ensuring this high rigidity, the diaphragm valve element 4 has a diameter D (hereinafter, also referred to as an "end face diameter D") of the columnar part 411 (the end face 411a) set wide and a protrusion 416 is provided radially more inside than the annular sealing protrusion 414.

Moreover, the end face diameter D is determined to be 1.3 times or more than the widthwise mean diameter A to provide a wide outer-circumferential width E from the annular sealing protrusion 414 (i.e., its outer-circumferential root) to an outer peripheral surface 411b of the columnar part 411. This configuration makes it easy for the main part 41 to perpendicularly press the annular sealing protrusion 414 against the valve seat surface 24a in a direction which the drive section 3 applies the load to the diaphragm valve element 4, thus enabling to reduce the displacement amount of the annular sealing surface 414a.

Further, the main part 41 has an axial thickness F at a center point of the annular sealing surface 414a in the widthwise direction, and this thickness F is determined to be 0.7 times or more than the widthwise mean diameter A. Thus, the main part 41 has the high rigidity enough to restrain deformation which may be caused over a portion above the annular sealing surface 414a when the annular sealing protrusion 414 is applied with the sealing load and brought into sealing contact with the valve seat 24. Furthermore, the main part 41 can widely disperse the load of the drive section 3 to the valve part 410. Herein, the main part 41 may be designed with the thickness F set to 0.7 times or less than the widthwise mean diameter A as long as the displacement amount of the annular sealing surface 414a is reduced to 6.175 μm or less. This configuration with the reduced thickness F can increase the volume of the diaphragm chamber 22 and reduce the size of the valve 1.

The protrusion 416 is formed radially more inside than the annular sealing protrusion 414 on the end face 411a and coaxial with the neck part 413 so that the end face 411a is reinforced on a valve seat side. The main part 41 is provided with the protrusion 416 designed such that a diameter H of a basal end (a root) connected to the main part 41 (the columnar part 411) is equal to or longer than a diameter J of the thinnest part formed between a pressure receiving surface 413c which is to receive the load from the drive section 3 and the end face 411a (hereinafter, referred to as a "thin part diameter J"). Specifically, the protrusion 416 has an outer peripheral point U at the basal end (hereinafter, also referred to as a "part U") located directly below or radially more outside than a part corresponding to the thin part diameter J. Thus, the main part 41 provided with the protrusion 416 has an increased thickness by just that much in the part to be subjected to the sealing load to increase the rigidity. Further, the protrusion 416 has a predetermined height I, from the basal end connected with the main part 41, set to 0.7 times or more than the height C of the annular sealing protrusion 414 (i.e., the height from the end face 411a to the annular sealing surface 414a of the annular sealing protrusion 414). The center part of the main part 41 has a thick thickness and thus possesses high rigidity.

The main part 41 includes an annular recessed groove 415 formed between the annular sealing protrusion 414 and the protrusion 416 so that the elastic deformation generated on the protrusion 416 is hardly transmitted to the annular sealing protrusion 414.

(Fluid Control Method of Fluid Control Valve)

Next, a fluid control method using the above-configured fluid control valve 1 will be explained. For instance, in the fluid control valve 1, the first port 21a is connected to a chemical liquid supply source and the second port 21*b* is connected to a reaction chamber of a semiconductor manufacturing device.

(General Operation of Fluid Control Valve)

When the fluid control valve 1 is in a standby condition in which the chemical liquid is not supplied to a wafer, an operation fluid is not supplied to the operation port 33*b*. In this condition, an urging force of the compression spring 36 acts on the diaphragm valve element 4 via the piston 35, holding the annular sealing protrusion 414 of the diaphragm valve element 4 hermetically sealed against the valve seat surface 24*a* of the valve seat 24. At this time, the valve section 2 shuts off a passage between the first port 21*a* and the second port 21*b* in order not to supply the chemical liquid from the second port 21*b* to the reaction chamber.

When the chemical liquid is about to be supplied to the wafer, the fluid control valve 1 is operated to supply the operation fluid to the operation port 33*b*. When inner pressure in the second chamber 34*b* becomes larger than the urging force of the compression spring 36, the piston 35 is moved against the urging force of the compression spring 36 toward an opposite side from the valve seat. Accordingly, the diaphragm valve element 4 is moved upward integrally with the piston 35 to separate the annular sealing protrusion 414 from the valve seat surface 24*a*. Thus, the fluid control valve 1 is operated to flow the chemical liquid from the first port 21*a* to the second port 21*b* in accordance with a stroke movement of the main part 41 and thus supply the chemical liquid to the reaction chamber.

When supply of the chemical liquid to the wafer is to be stopped, the fluid control valve 1 is operated to discharge the operation fluid from the operation port 33*b*. Then, the piston 35 is urged by the compression spring 36 to move toward the valve seat, thereby pressing the neck part 413 of the diaphragm valve element 4 toward the valve seat. Accordingly, the diaphragm valve element 4 is moved downward integral with the piston 35, so that the annular sealing surface 414*a* of the annular sealing protrusion 414 comes into contact with the valve seat surface 24*a*. Subsequently, the sealing load is applied to the annular sealing protrusion 414 to press-contact the annular sealing surface 414*a* against the valve seat surface 24*a*. Thus, the fluid control valve 1 enters the standby condition.

(Abrasion Caused by Deformation of Valve Element in Valve Closing and Method for Reducing Abrasion)

In the fluid control valve 1, the diaphragm valve element 4 has the thin part diameter J which is smaller than the widthwise mean diameter A of the annular sealing surface 414*a*. Therefore, in the valve element 4, a point of load where the annular sealing surface 414*a* is pressed against the valve seat surface 24*a* is displaced radially outside of a point of effort where the drive force of the drive section 3 is transmitted to the end face 411*a*. During the valve closing operation, the annular sealing surface 414*a* of the annular sealing protrusion 414 is brought into contact with the valve seat surface 24*a*, and further the diaphragm valve element 4 is applied with the sealing load from the drive section 3 to hold the annular sealing surface 414*a* pressed on the valve seat surface 24*a*. At this time, in the diaphragm valve element 4, the center part of the main part 41 which is not supported by the valve seat 24 tries to be elastically deformed toward the valve seat. The larger the elastic deformation amount of the main part 41 becomes, the more largely the valve element 4 is elastically deformed to displace the annular sealing surface 414*a* radially outwards. If this elastic deformation of the annular sealing protrusion 414 is large, the rubbed amount of the annular sealing surface 414*a* against the valve seat surface 24*a* is increased and the annular sealing surface 414*a* gets easily abraded. This abrasion of the annular sealing surface 414*a* results in generation of particles.

However, in the present embodiment, in order to reduce the abrasion of the annular sealing surface 414*a* caused in the above valve-closing operation, the diaphragm valve element 4 has the configuration to restrain the displacement amount of the annular sealing surface 414*a* displaced in a radially outward direction, so that generation of particles is restrained or prevented. Accordingly, even if the size of problematic particles which may affect semiconductor manufacturing become minute in association with downsizing of a semiconductor device, the fluid control device 1 capable of restraining or preventing generation of any particles can address such a circumstance.

(Explanation of Specific Operation Method to Reduce Abrasion of Annular Sealing Surface Caused in Valve Closing)

During the pressing operation from the time when the annular sealing surface 414*a* is brought into contact with the valve seat surface 24*a* to the time when the annular sealing surface 414*a* is pressed and sealed with the valve seat surface 24*a* by a predetermined pressing load, the fluid control valve 1 is configured such that the displacement amount of the annular sealing surface 414*a* displaced radially outwards with respect to the valve seat 24 is reduced. Specifically, the displacement amount is reduced to 6.175 µm or less ($12.4 \times 10^{-4}$ times of the widthwise mean diameter A or $6.18 \times 10^{-2}$ times of the radial width B). As mentioned above, when the displacement amount of the annular sealing surface 414*a* is reduced, the annular sealing surface 414*a* is hardly rubbed and abraded, and therefore generation of particles affecting semiconductor manufacturing can be reduced. Further, by restraining abrasion caused by deformation of the main part 41, the sealing performance does not lower even if the valve opening and closing operation is repeated. Thus, endurance of the fluid control valve 1 is improved. Further, the fluid control valve 1 requires less sealing force and the drive section 3 can be made compact. The diaphragm valve element 4 has the configuration capable of achieving those effects.

The diaphragm valve element 4 has the end face diameter D 1.3 times or more than the widthwise mean diameter A, and hence the end face 411*a* and its surroundings have high rigidity. Therefore, the diaphragm valve element 4 is, during the pressing operation, restrained from deformation on the end face 411*a*, and the annular sealing protrusion 414 is hardly drawn by the end face 411*a*. Thus, in the diaphragm valve element 4, the annular sealing protrusion 414 is hardly deformed to displace the annular sealing surface 414*a* with respect to the valve seat surface 24*a*, and abrasion of the annular sealing surface 414*a* is restrained. Accordingly, the fluid control valve 1 can achieve reduction in abrasion of the annular sealing surface 414*a* caused by deformation of the valve element 4 (the main part 41) in valve closing and also achieve restraint or prevention of generation of particles.

Further, the diaphragm valve element 4 has a diameter at the thinnest part of the main part 41, namely, the thin part diameter J which is smaller than the widthwise mean diameter A, and thus a portion of the end face 411*a* located more inside than the annular sealing protrusion 414 is pressed toward the valve seat 24. However, in the fluid control valve 1, the displacement amount of the annular sealing surface 414*a* displaced in the radial direction is reduced, and therefore abrasion on the annular sealing surface 414*a* and generation of particles can be restrained.

In the diaphragm valve element 4, the axial thickness F at the center point of the annular sealing surface 414a in the widthwise direction is 0.7 times or more than the widthwise mean diameter A, and therefore, deformation generated by the load from the drive section 3 begins to disperse at a position apart from the end face 411a. Accordingly, deformation is apt to be generated vertically in the end face 411a and its surroundings. Therefore, the fluid control valve 1 of the present embodiment makes it easy to press the annular sealing surface 414a against the valve seat surface 24a, and the displacement amount of the annular sealing surface 414a displaced in the radial direction can be reduced.

Further, the diaphragm valve element 4 is provided with the protrusion 416 protruding from the end face 411a toward the valve seat 24 and located more inside than the annular sealing protrusion 414, and therefore the rigidity at a portion to receive the load from the drive section 3 is high and the annular sealing surface 414a is hardly deformed to make an inner side of the annular sealing protrusion 414 protrude toward the valve seat 24. Accordingly, in the fluid control valve 1, the annular sealing protrusion 414 is hardly flexed by deformation of the end face 411a, so that a displacement amount of the annular sealing surface 414a is reduced.

Especially, the protrusion 416 has the basal end part diameter H as being equal to or longer than the thin part diameter J, and hence the protrusion 416 receives the whole load from the drive section 3 in order not to deform the main part 41 radially outwards. Accordingly, the fluid control valve 1 can restrain deformation of the end face 411a and thus reduce the displacement amount of the annular sealing surface 414a.

Moreover, the protrusion 416 has the height I from the basal end part to a leading end face 416a, the height I being 0.7 times or more than the height C, and therefore the annular recessed groove 415 is formed deep. As a result, deformation is hardly transmitted from the protrusion 416 to the annular sealing protrusion 414. Therefore, the annular sealing surface 414a is hardly displaced with respect to the valve seat surface 24a and hardly abraded during the pressing operation. Accordingly, the fluid control valve 1 can achieve reduction in abrasion caused by deformation of the diaphragm valve element 4 in valve closing.

As mentioned above, the fluid control valve 1 and the fluid control method can achieve reduction in abrasion caused by deformation of the diaphragm valve element 4 in valve closing. The fluid control valve 1 reduces slight abrasion caused by deformation of the diaphragm valve element 4 in valve closing, and therefore generation of minute particles can be restrained or prevented.

(Effect Confirmation Tests)

The present inventors have conducted the following tests for studying the effects to be given to a displacement amount of the annular sealing surface, specifically studying (a) an effect of an end face diameter D, (b) an effect of a thickness F, (c) an effect of a protrusion, (d) an effect of an annular recessed groove, (e) an effect of a basal end part diameter H, (f) an effect of a height I of the protrusion, (g) an effect of a combination of the end face diameter D and the thickness F, (h) an effect of a combination of the protrusion and the end face diameter D, and (i) an effect of a combination of the protrusion, the thickness F, and the height G.

Figure 4:
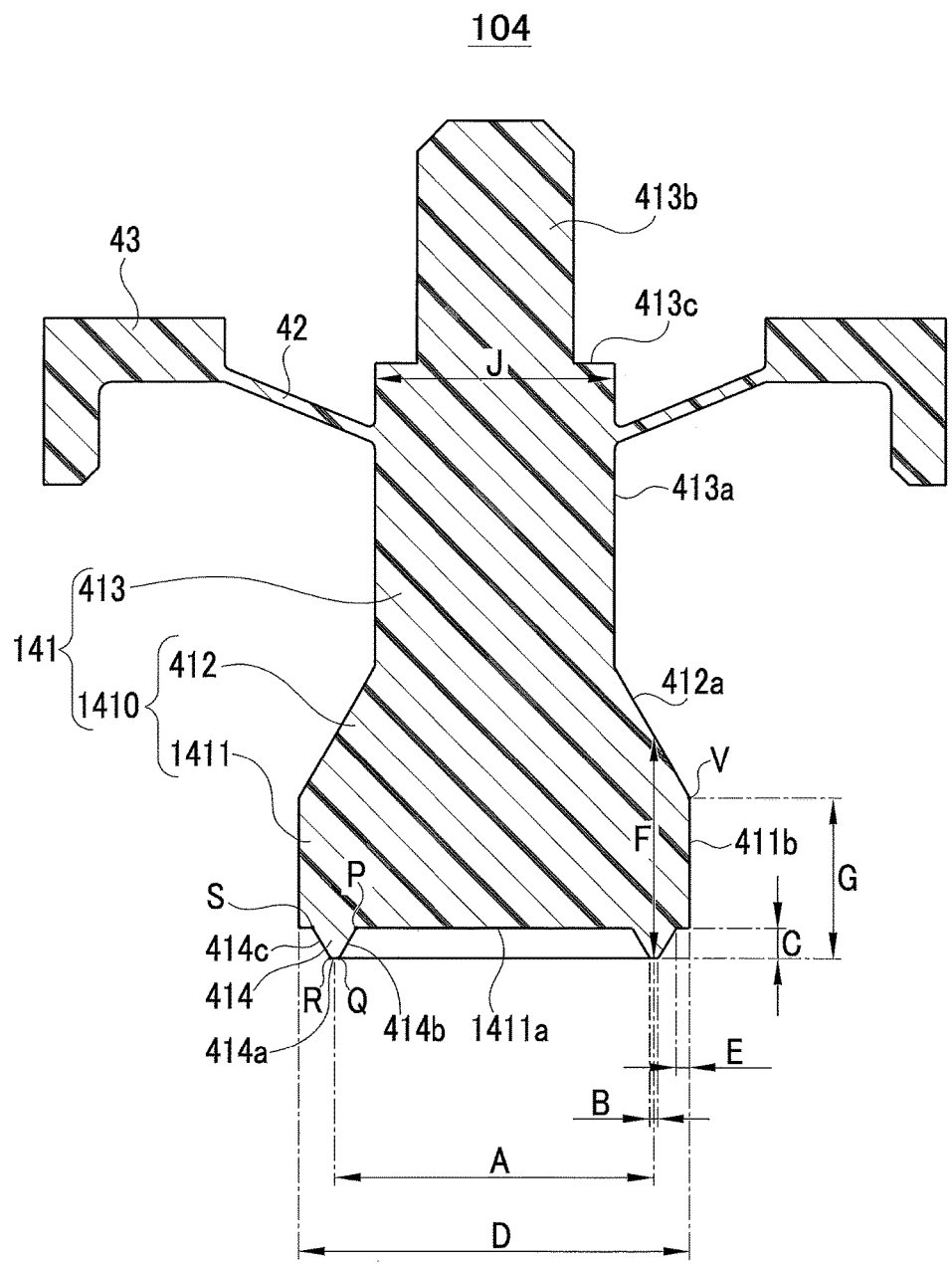
FIG. 4 is a sectional view of a valve element in the example 10.
Figure 5:
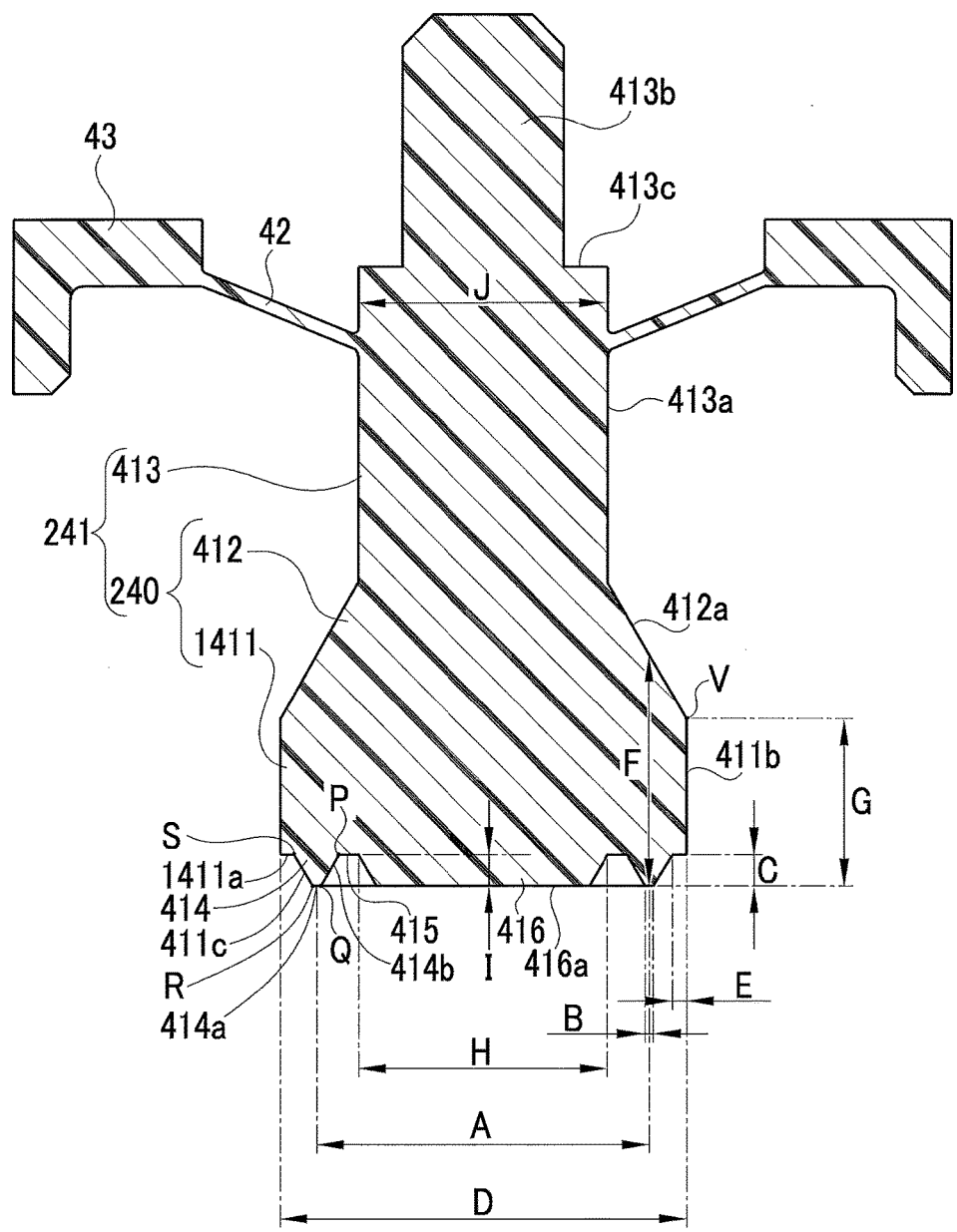
FIG. 5 is a sectional view of a valve element in the example 1.
Figure 6:
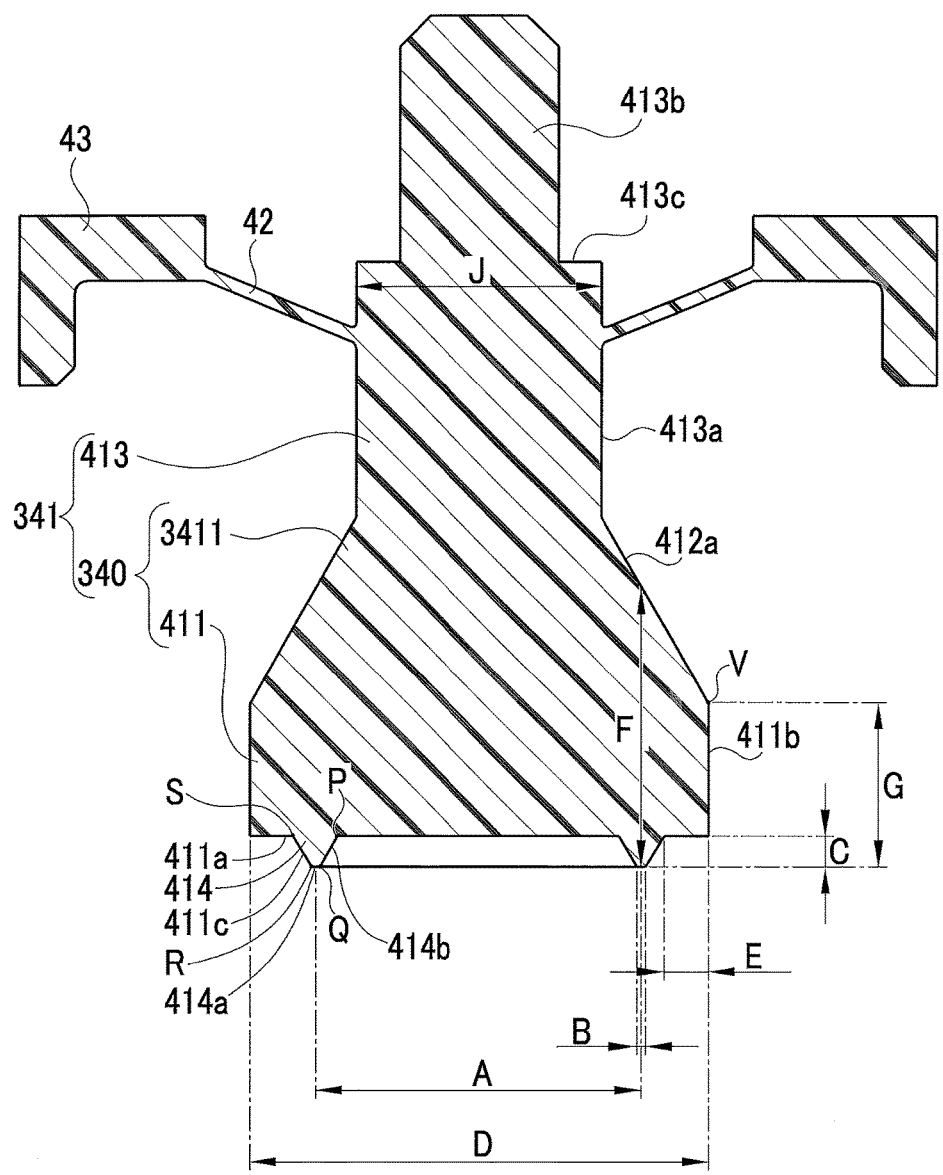
FIG. 6 is a sectional view of a valve element in the example 2.

For the effect confirmation tests, as shown in FIG. 3, comparative examples 1 to 3 and examples 1 to 13 each having different dimensions are prepared. FIG. 3 is a table showing setting conditions of the comparative examples 1 to 3 and the examples 1 to 13 which are used for the effect confirmation tests. FIGS. 4 to 6 are sectional views each showing a valve element 104 in the example 10, a valve element 204 in the example 1, and a valve element 304 in the example 2. The example 4 corresponds to the above mentioned diaphragm valve element 4 (see FIG. 2). In the following explanation and figures cited therein, constituents of the comparative examples 1 to 3 and the examples 1 to 3, 5 to 13 which are in common with the configuration of the diaphragm valve element 4 of the example 4 are applied with the same referential signs with those in FIG. 2, and the explanation thereof is omitted as appropriate. Further, in the following explanation, "the diaphragm valve element 4" is also referred to as "the valve element 4."

In the effect confirmation tests, an analysis software manufactured by Dassault Systemes Solid Works Corp. is used. In the tests, as for each of the comparative examples 1 to 3 and the examples 1 to 13, the inventors have made analyses of each displacement amount generated in valve main bodies 841, 1441, 1541, 241, 341, 441, 41, 541, 641, 1043, 1141, 741, 141, 1242, 1342, and 943 which are arranged with physical property elastic modulus of 500 MPa and density of 2200 kg/m$^3$ during a pressing operation from the start of the contact of the annular sealing surface 414a with the valve seat 24 to the time when the annular sealing surface 414a is pressed against the valve seat surface 24a with a sealing load of 50 N. FIGS. 7 to 22 show the results of the analyses. FIG. 23 is a table showing a displacement amount of the annular sealing surface 414a in each of the comparative examples 1 to 3 and the examples 1 to 13, a displacement amount ratio of the annular sealing surface 414a of the comparative examples 1 to 3 and the examples 1 to 13 when a displacement amount of the annular sealing surface 414a in the example 10 is assumed to be 100%, a ratio of the displacement amount of the annular sealing surface 414a with respect to a widthwise mean diameter A, and a ratio of the displacement amount of the annular sealing surface 414a with respect to a radial width B in the respective examples.

<(a) Effect of an End Face Diameter D Influencing on a Displacement Amount of an Annular Sealing Surface>

The comparative examples 1 and 2, the examples 7 and 10, which are different only in each end face diameter D as shown in FIG. 3, are compared. As shown in FIGS. 3 and 4, the example 10 is designed such that the widthwise mean diameter A of the annular sealing surface 414a is 5.0 mm, the radial width B of the annular sealing surface 414a is 0.1 mm, and the height C of the annular sealing protrusion 414 is 0.5 mm. Further, in the example 10, the end face diameter D is formed to be 6.5 mm which is 1.30 times of the widthwise mean diameter A. The example 10 is further arranged such that an outer circumferential width E from a connecting point S (hereinafter, also referred to as a "part S") where the outer peripheral surface 414c of the annular sealing protrusion 414 contacts with the end face 411a to the outer peripheral surface 411b of the columnar part 1411 is 0.25 mm. Further, in the example 10, an axial thickness F at a center point of the annular sealing surface 414a in the widthwise direction is formed to be 3.7 mm. In the example 10, the height G from the annular sealing surface 414a to an upper end V of the columnar part 1411 is formed to be 2.65 mm. Furthermore, the example 10 is designed such that a thin part diameter J is formed to be 4 mm. Herein, the comparative example 1 is not provided with a protrusion and an annular recessed groove.

As shown in FIG. 3, the comparative examples 1 and 2 and the example 7 are configured as similar to the example 10 except for the dimensions of the end face diameter D and the outer circumferential width E. The end face diameter D of the comparative example 1 is 6.0 mm, which is 1.2 times of the widthwise mean diameter A. The outer circumferential width E of the comparative example 1 is 0 mm. The end face diameter D of the comparative example 2 is 6.25 mm, which is 1.25 times of the widthwise mean diameter A. The outer circumferential width E of the comparative example 2 is 0.125 mm. The end face diameter D of the example 7 is 7.5 mm, which is 1.5 times of the widthwise mean diameter A. The outer circumferential width E of the example 7 is 1.75 mm.

Figure 7:
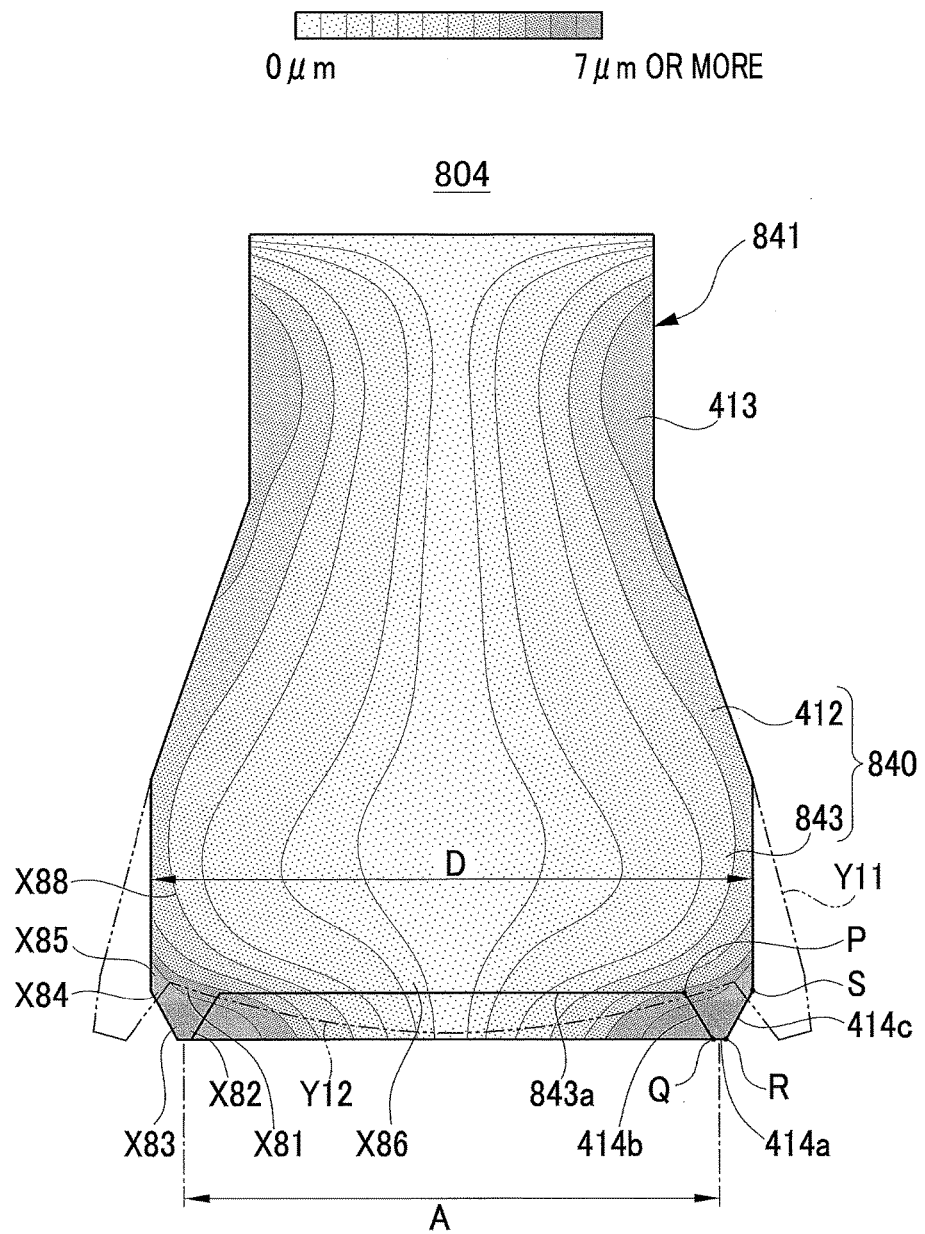
FIG. 7 is a view showing an analysis result of a displacement amount in the comparative example 1.

FIG. 7 shows an analysis result of a displacement amount in the comparative example 1. As indicated with X86 and X88 in the figure, in the main part 841 of the comparative example 1, a displacement amount of the columnar part 843 is gradually increased from a center part toward radially outside. The columnar part 843 has a rate of change in its displacement amount gradually increased as being closer to the outer peripheral surface 411b. Further, the columnar part 843 has its displacement amount increased over a portion above the annular sealing protrusion 414 in the figure as being closer to the annular sealing protrusion 414. Thus, as indicated with a chain line Y11 in the figure, the comparative example 1 is confirmed that the columnar part 843 is pressed by the load from the drive section 3 during the pressing operation and deformed to expand the end face 843a radially outwards. Further, in the comparative example 1, as indicated with X 85 and X86 in the figure, the displacement amount in a center part of the end face 843a and the displacement amount in an outer peripheral part have a large difference. Therefore, it is confirmed that the end face 843a of the comparative example 1 is curved and deformed as indicated with a chain line Y12 in the figure such that its center part protrudes toward a valve seat and its outer peripheral part is drawn toward an opposite side from the valve seat. Thus, the end face 843a is pressed against the valve seat surface 24a such that the annular sealing protrusion 414 is pushed out radially outwards.

As indicated with X81 to X 85 in FIG. 7, in the comparative example 1, each displacement amount at the respective parts Q, R, and S of the annular sealing protrusion 414 is larger than the displacement amount at the part P. Accordingly, it is confirmed that in the comparative example 1, the annular sealing protrusion 414 is flexed at its leading end part radially outwards and deformed during the pressing operation. As shown in FIG. 23, the displacement amount of the annular sealing surface 414a is 9.428 μm in the comparative example 1. This displacement amount is $18.90 \times 10^{-4}$ times of the widthwise mean diameter A, or $9.43 \times 10^{-2}$ times of the radial width B of the annular sealing surface 414a.

Figure 8:
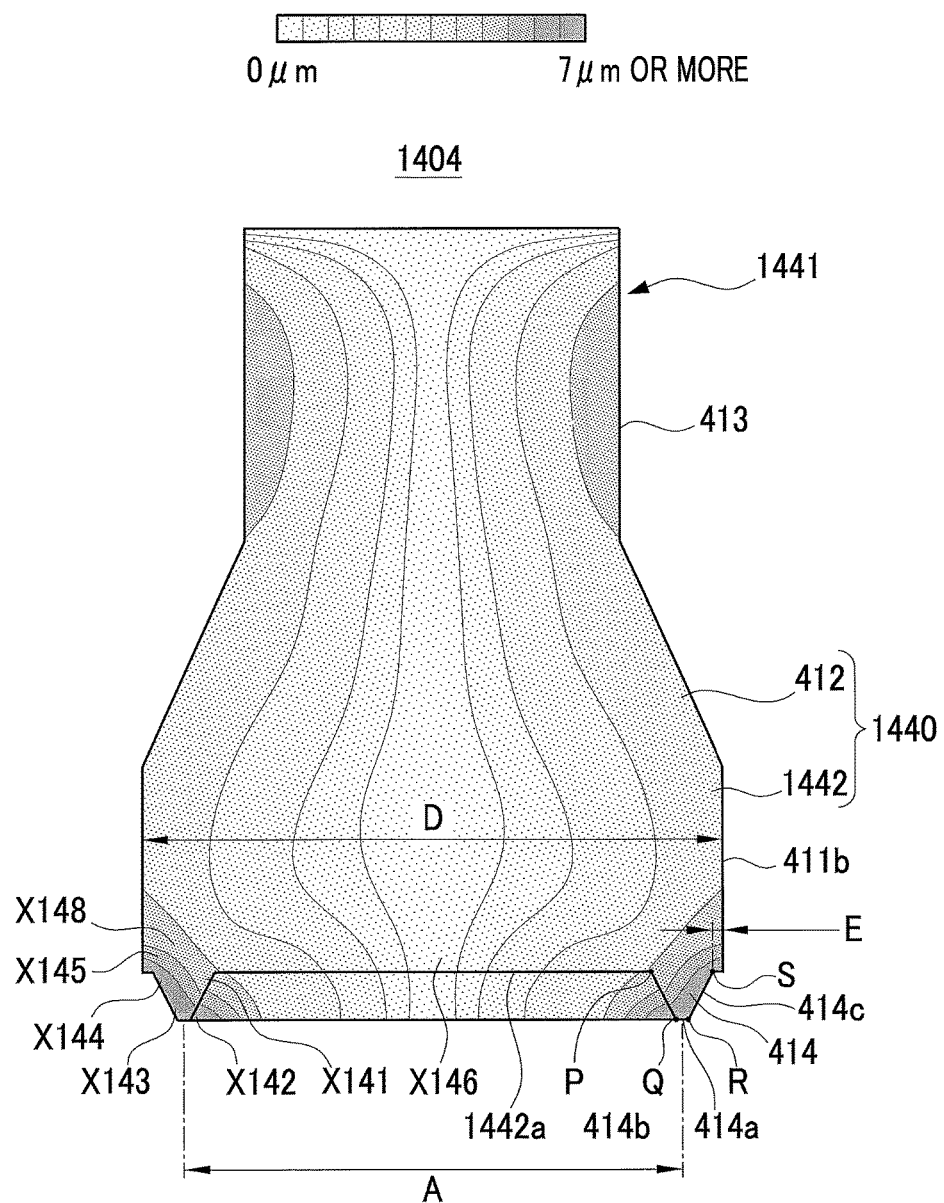
FIG. 8 is a view showing an analysis result of a displacement amount in the comparative example 2.

FIG. 8 shows an analysis result of the displacement amount of the comparative example 2. In the main part 1441 of the comparative example 2, as indicated with X146 and X148 in the figure, a displacement amount of the columnar part 1442 is gradually increased from a center part to a radially outer part. The rate of change in the displacement amount is smaller than the comparative example 1. This is conceivably because the comparative example 2 has an outer circumferential width E larger than the comparative example 1 and thus has high rigidity, so that deformation in the center part is hardly transmitted to the radially outer part. However, in the comparative example 2, as indicated with X146 and X 145 in the figure, a difference in displacement amount between the center part and an outer peripheral part of the end face 1442a is large as similar to the comparative example 1. Accordingly, it is confirmed in the comparative example 2 that the end face 1442a is largely deformed as similar to the comparative example 1. Further, as indicated with X141 to X144 in the figure, in the comparative example 2, each displacement amount at the parts Q, R, and S is larger than the part P, and hence as similar to the comparative example 1, the annular sealing protrusion 414 is flexed and deformed largely to expand its leading end part in a radially outer direction. As indicated in FIG. 23, the displacement amount of the annular sealing surface 414a is 7.233 μm in the comparative example 2. This displacement amount is $14.47 \times 10^{-4}$ times of the widthwise mean diameter A and $7.23 \times 10^{-2}$ times of the radial width B of the annular sealing surface 414a.

Figure 19:
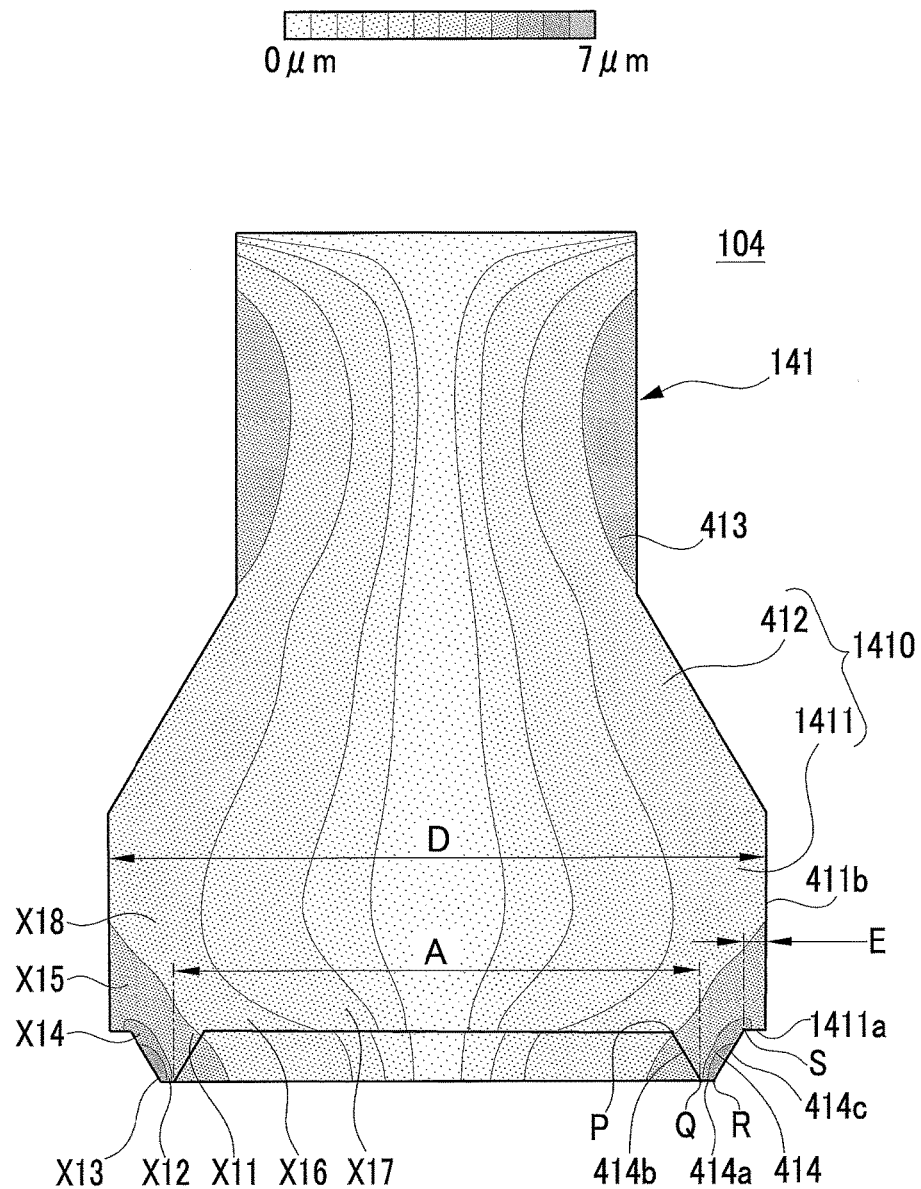
FIG. 19 is a view showing an analysis result of a displacement amount in the example 10.

FIG. 19 shows an analysis result of a displacement amount analysis of the example 10. The main part 141 of the example 10 is, as indicated with X17 and X18 in the figure, gradually increased its displacement amount from a center part to a radially outer part of the columnar part 1411. The rate of change in the displacement amount is reduced as similar to the comparative example 2. In the example 10, as indicated with X15 to X18, the difference of the displacement amount between the center part and the outer peripheral part of the end face 1411a is smaller than the comparative example 2. Accordingly, it is confirmed that deformation of the end face 411a is restrained in the example 10 as compared to the comparative example 2, and the annular sealing protrusion 414 is more easily pressed against the valve seat surface 24a.

Further, as indicated with X11 to X14 in FIG. 19, each displacement amount at the parts P, Q, and S in the example 10 is smaller than the comparative examples 1 and 2. Accordingly, unlike the comparative examples 1 and 2, the annular sealing protrusion 414 of the example 10 is hardly flexed in a radially outer direction and thus displacement at an inner peripheral side of the annular sealing surface 414a can be restrained. As shown in FIG. 23, in the example 10, the displacement amount of the annular sealing surface 414a is 6.175 μm. This displacement amount is $12.40 \times 10^{-4}$ times of the widthwise mean diameter A, or $6.18 \times 10^{-2}$ times of the radial width B of the annular sealing surface 414a.

Figure 16:
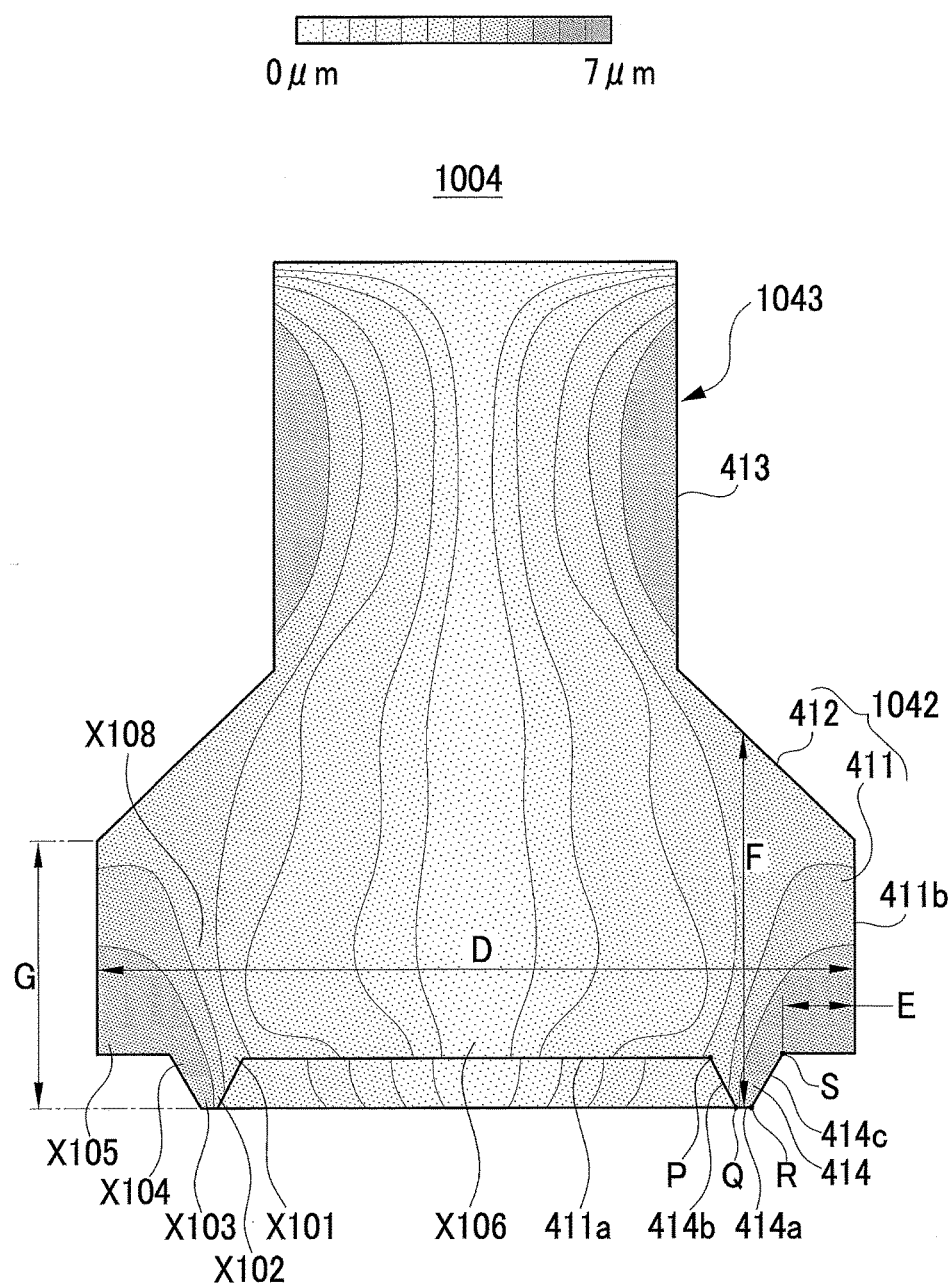
FIG. 16 is a view showing an analysis result of a displacement amount in the example 7.

FIG. 16 shows an analysis result of a displacement amount of the example 7. In the main part 1043 of the example 7, as indicated with X106 and X108 in the figure, the displacement amount is increased form the center part to a radially outer part of the columnar part 411. The rate of change is smaller than the example 10. Moreover, in the columnar part 411, the displacement amount varies almost coaxially about an axis of the columnar part 411. Therefore, in the example 7, the columnar part 411 is vertically deformed during the pressing operation and the annular sealing protrusion 414 is easily pressed against the valve seat surface 24a in the vertical direction. Further, in the example 7, as indicated with X101 to X104 in the figure, each displacement amount in the parts P, Q, R, and S is smaller than the example 10. Accordingly, it is confirmed that in the example 7, the annular sealing protrusion 414 is less flexible to expand the leading end part in the radially outer direction than the example 10, so that displacement amount at the parts Q and R is reduced. As indicated in FIG. 23, in the example 7, the displacement amount of the annular sealing surface 414a is 4.887 μm. This displacement amount is $9.77 \times 10^{-4}$ times of the widthwise mean diameter A, or $4.89 \times 10^{-2}$ times of the radial width B of the annular sealing surface 414a.

Figure 25:
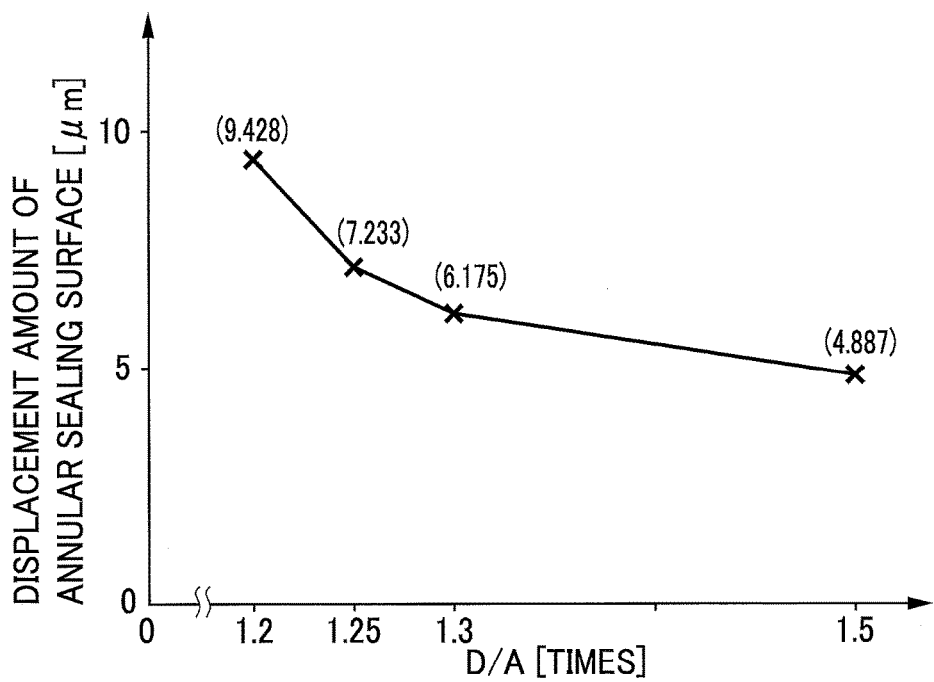
FIG. 25 is a graph showing a relation between a ratio (D/A) of an end face diameter relative to a widthwise mean diameter and the displacement amount of the annular sealing surface, in which a vertical axis indicates the displacement amount (μm) of the annular sealing surface and a lateral axis indicates D/A (ratio)

FIG. 25 is a graph showing a relation between a ratio (D/A) of the end face diameter D relative to the widthwise mean diameter A and the displacement amount of the annular sealing surface 414a. In the comparative example 1 with D/A of 1.2, the displacement amount of the annular sealing surface 414*a* displaced during the pressing operation is 9.428 µm. In the comparative example 2 with D/A of 1.25, the displacement amount of the annular sealing surface 414*a* displaced during the pressing operation is 7.233 µm. In the example 10 with D/A of 1.30, the displacement amount of the annular sealing surface 414*a* displaced during the pressing operation is 6.175 µm. In the example 7 with D/A of 1.5, the displacement amount of the annular sealing surface 414*a* displaced during the pressing operation is 4.887 µm. From those results, the decreasing rate of the displacement amount of the annular sealing surface 414*a* becomes gentle instantly after the end face diameter D becomes 1.3 times or more than the widthwise mean diameter A. This is conceivably because when the end face diameter D is 1.3 times or more and the outer circumferential width E is increased, a wall with a thick thickness enough to receive deformation of a center part of the columnar part in a radially outer direction is formed more outside than the annular sealing protrusion 414, ensuring high rigidity of the main part. Accordingly, the end face diameter D is preferably made as long as 1.3 times or more than the widthwise mean diameter A.

The present inventors have formed the valve element 104 shown in FIG. 4 based on the example 10 and have conducted a particle test for this valve element 104. The particle test is firstly conducted with a preparatory process that a line in which pure water flows is provided in advance with a valve to be evaluated (a valve attached with the valve element 104), and flushing with the valve is performed with flowing pure water at a rate of 1000 mL/min for three consecutive hours in a valve-fully-opened state. Thereafter, the line in which pure water flows is set with the valve and a particle counter is further provided at a downstream side of the valve. The valve is operated to open and close 15000 times for the period of 600 minutes with the sealing load of 50 N to flow pure water at 1000 mL/min on the condition that 75 mL/min of the pure water having passed through the evaluated valve is made to be introduced into the particle counter. The particle counter counts an accumulated number of particles with a size of 20 nm or more per 1 minute, and the number of particles included in 1 mL for 15000 times of the valve opening and closing operation is counted. This particle test result of the evaluated valve attached with the valve element 104 is shown in FIG. 24.

Figure 24:
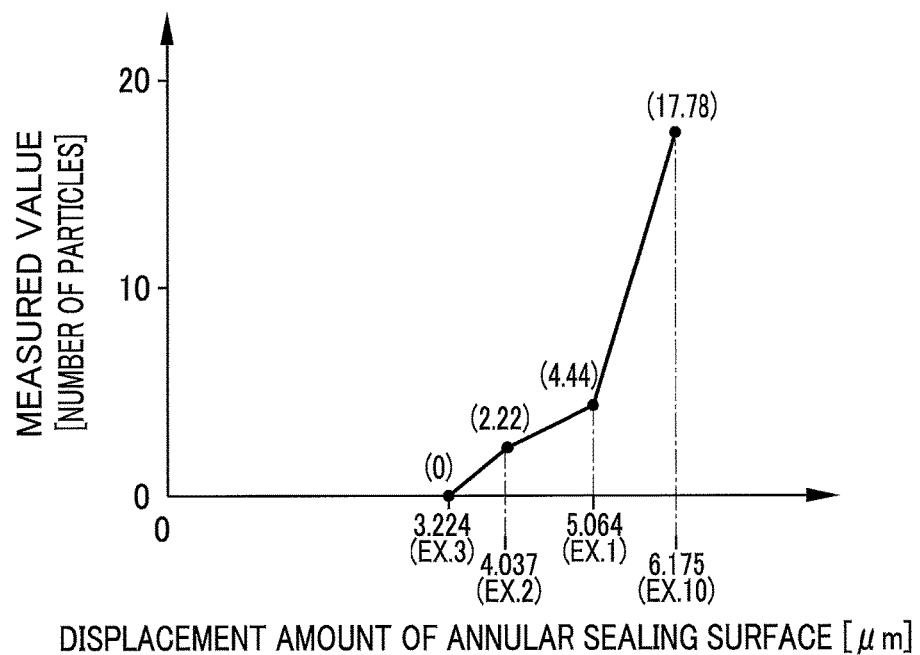
FIG. 24 is a graph showing a particle measured value, in which a vertical axis indicates the number of particles with a size of 20 nm or more and a lateral axis indicates the displacement amount of the annular sealing surface (μm)

As shown in FIG. 24, in the valve element 104, 17.78 particles per 1 mL are measured during the particle test.

In response to this, the present inventors have also performed the particle test with a sample which has no measures taken for reducing the displacement amount of the annular sealing surface 414*a* to be 6.175 µm or more and 9 µm or less. The method of the particle test is similar to the above mentioned particle test, and therefore the explanation is omitted. According to the test result, the particles counted during the particle test in that sample were 797.8. From those test results, it is confirmed that the particle generation amount is abruptly increased when the displacement amount of the annular sealing surface 414*a* gets over 6.175 µm. Accordingly, when the valve element is made to reduce the displacement amount of the annular sealing surface 414*a* to 6.175 µm or less, the particle generation amount can be effectively reduced.

The present inventors have photographed a microphotograph of the annular sealing surface 414*a* of the valve element 104 after termination of the particle test. When a magnification of 500 times is set for the microphotograph, the valve element 104 is confirmed with burrs at the part Q of the annular sealing surface 414*a*, but no burrs are found at the part R of the annular sealing surface 414*a*. The reason why no burrs are generated at the part R of the annular sealing surface 414*a* is conceived that burrs generated at the part R are enfolded and leveled in between the annular sealing surface 414*a* and the valve seat surface 24*a* while the annular sealing surface 414*a* is moved radially outwards.

Figure 26:
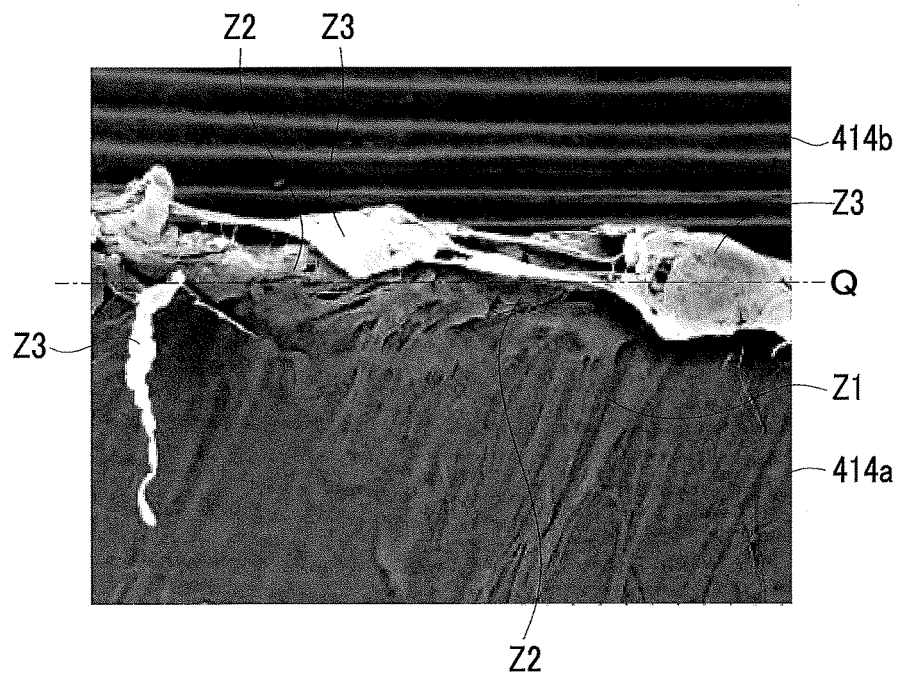
FIG. 26 is a microphotograph image of the annular sealing surface photographed after a particle test for the valve element in the example 10 in FIG. 4.
Figure 27:
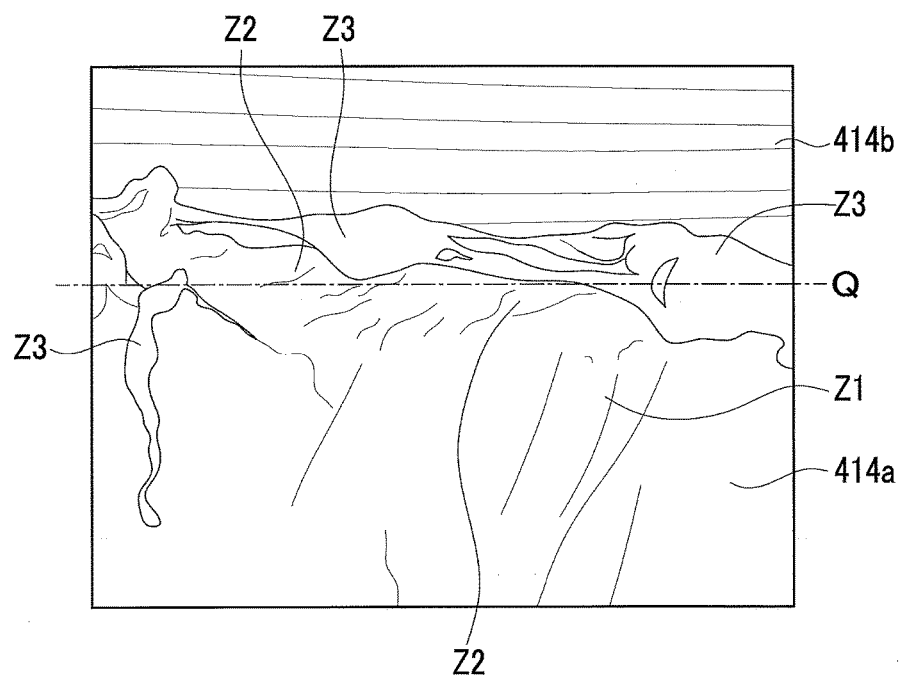
FIG. 27 is a drawing image of the microphotograph image shown in FIG. 26.

Further, the inventors have raised the magnification from 500 times to 2000 times for the microphotograph and studied a state of the part Q and its periphery. The valve element 104 is confirmed to generate thin wrinkles as indicated with Z1 in FIGS. 26 and 27, and as indicated with Z2 in the figure, generate tiny scratches. Further, the valve element 104 is, as indicated with Z3 in the figure, confirmed to generate burrs which are drawn and turned up from the part Q of the annular sealing surface 414*a* to an inner peripheral surface 414*b* side. From those results, it is conceived that when the valve opening and closing operation starts, in the valve element 104, the annular sealing surface 414*a* is rubbed its part Q with the valve seat to make tiny scratches. These scratches are gradually turned up to become burrs while repeating the valve opening and closing operation, and these burrs are conceivably separated from the annular sealing surface 414*a* to become particles. Accordingly, when it is restrained that the annular sealing protrusion 414 is deformed to displace the annular sealing surface 414*a* in a radial direction, the abrasion of the part Q is reduced and minute particles which cannot be measured by the particle counter can be reduced as well as reducing generation of particles which are measurable by the particle counter.

<(b) Effect of a Thickness F Influencing on a Displacement Amount of an Annular Sealing Surface>

The comparative example 3, the example 2 and the example 7, which are different only in the thickness F as shown in FIG. 3, are compared. The comparative example 3 is designed such that the axial thickness F at a center point of the annular sealing protrusion 414 in the widthwise direction is 3 mm which is 0.6 times of the widthwise mean diameter A (5 mm) of the annular sealing surface 414*a*. The example 7 is designed such that the axial thickness F is 3.7 mm which is 0.74 times of the widthwise mean diameter A (5 mm) of the annular sealing surface 414*a*. The example 2 is designed such that the axial thickness F is 4.5 mm which is 0.9 times of the widthwise mean diameter A(5 mm) of the annular sealing surface 414*a*. Each of the valve main bodies 1541, 341, and 1043 of the comparative example 3, the examples 2 and 7 has the same height G and the thickness F is adjusted its length by the shoulder parts 1542, 3411, and 412.

Figure 9:
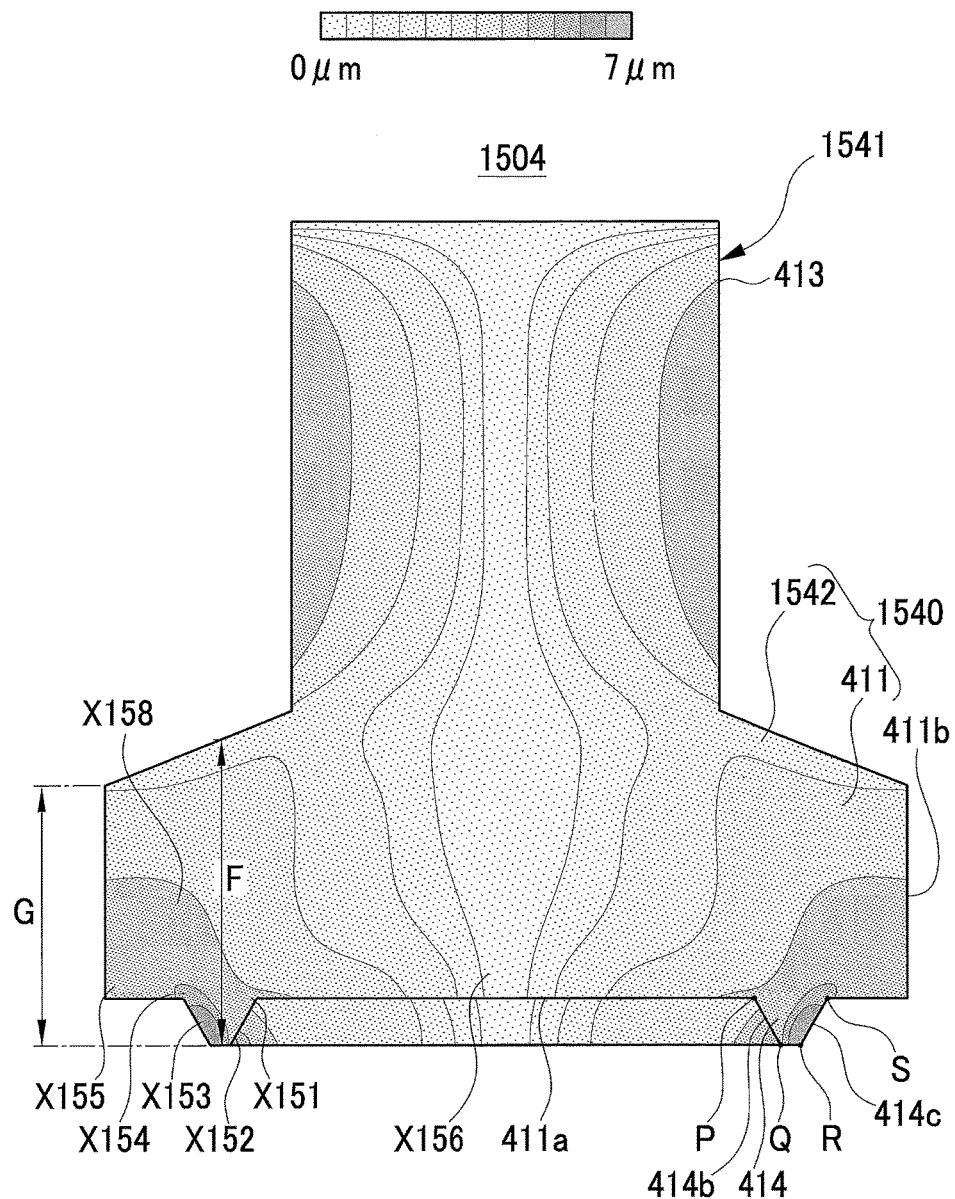
FIG. 9 is a view showing an analysis result of a displacement amount in the comparative example 3.

FIG. 9 shows an analysis result of the displacement amount of the comparative example 3. As indicated with X156 and X158 in the figure, in the main part 1541 of the comparative example 3, the displacement amount of the valve part 1540 is increased from its center part to a radially outer part. As indicated with X158 in the figure, in the valve part 1540, the displacement amount at an upper part above the annular sealing protrusion 414 is gradually increased toward the annular sealing protrusion 414. Moreover, the main part 1541 has a large difference in its displacement amount between the center part and the outer peripheral part of the end face 411*a*. Therefore, in the comparative example 3, the columnar part 411 is deformed to protrude a side of the end face 411*a* radially outwards during the pressing operation, and hence the annular sealing protrusion 414 is not easily pressed vertically against the valve seat surface 24*a*. Then, as indicated with X151 to X154 in the figure, it is confirmed that the displacement amount of the annular sealing protrusion 414 is larger at a side of the outer peripheral surface 414c than a side of the inner peripheral surface 414b, and the sealing protrusion 414 is flexed to expand its leading end part radially outwards. As shown in FIG. 23, in the comparative example 3, the displacement amount of the annular sealing surface 414a is 6.449 μm. This displacement amount is $12.90 \times 10^{-4}$ times of the widthwise mean diameter A of the annular sealing surface 414a, or $6.45 \times 10^{-2}$ times of the radial width B.

As indicated with X108 in FIG. 16, the main part 1043 in the example 7 is changed its displacement amount at a portion above the annular sealing protrusion 414 concentrically about an axis. Namely, in the main part 1043, the valve part 1042 is apt to be deformed vertically and the annular sealing protrusion 414 is easily pressed against the valve seat surface 24a in the vertical direction. Further, as indicated with X101 to X104 in the figure, each displacement amount at the parts P, Q, R, and S in the example 7 is smaller than the comparative example 3. Therefore, the main part of the example 7 is less flexible than the comparative example 3. As shown in FIG. 23, in the example 7, the displacement amount of the annular sealing surface 414a is 4.887 pin. This displacement amount is $9.77 \times 10^{-4}$ times of the widthwise mean diameter A of the annular sealing surface 414a, or $4.89 \times 10^{-2}$ times of the radial width B.

Figure 11:
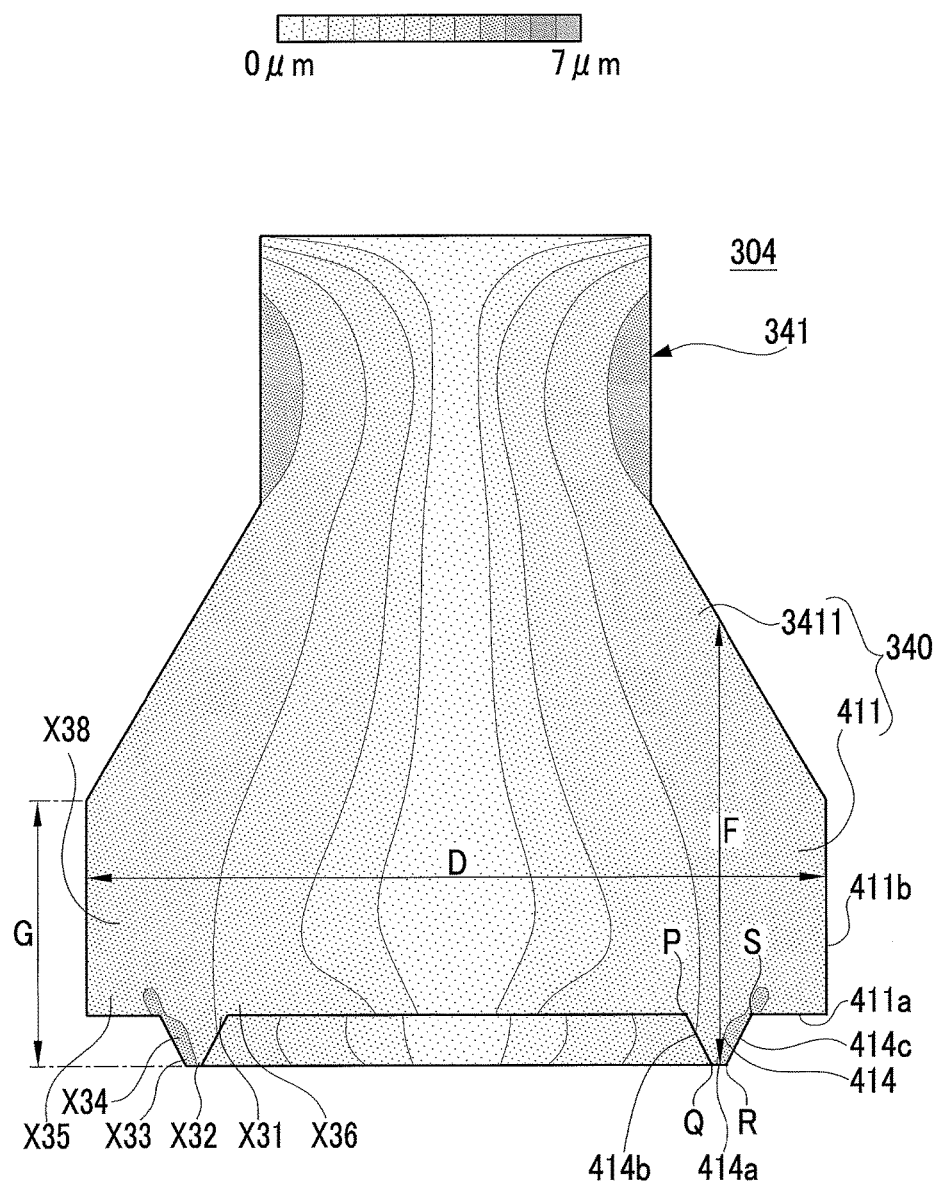
FIG. 11 is a view showing an analysis result of a displacement amount in the example 2.

FIG. 11 shows an analysis result of the displacement amount in the example 2. As indicated with X36 and X38 in the figure, in the main part 341 of the example 2, the displacement amount of a portion above the annular sealing protrusion 414 varies further concentrically about the axis than the example 7. Further, as indicated with X31 and X32 in the figure, as compared to the example 7, each displacement amount at the parts P and Q of the annular sealing protrusion 414 is small in the example 2. Accordingly, the columnar part 411 and the annular sealing protrusion 414 of the example 2 are easily deformed in the vertical direction as compared to the example 7. As shown in FIG. 23, in the example 2, the displacement amount of the annular sealing surface 414a is 4.037 μm. This displacement amount is $8.07 \times 10^{-4}$ times of the widthwise mean diameter A of the annular sealing surface 414a, or $4.04 \times 10^{-2}$ times of the radial width B.

Accordingly, the valve element can reduce the displacement amount of the annular sealing surface 414a only by increasing the thickness F. This is conceivably because the valve element with a thick thickness F disperses the load from the drive section 3 at a position apart from the end face, so that the load is apt to act in a valve seating direction (in a vertical direction).

<(c) Effect of a Protrusion Influencing on a Displacement Amount of an Annular Sealing Surface>

A valve element 204 of the example 1 and a valve element 104 of the example 10, which are only different in presence or absence of the protrusion 416 as shown in FIG. 3, are compared. The example 1 is different from the example 10 only in the feature that the protrusion 416 is provided. The example 10 has been mentioned above and hence its explanation is omitted. The protrusion 416 of the example 1 has a basal end part diameter H of 4 mm. Further, the protrusion 416 has a height I from the leading end face 416a to the end face 1411a as 0.5 mm which is equal to the height C of the annular sealing protrusion 414.

Figure 10:
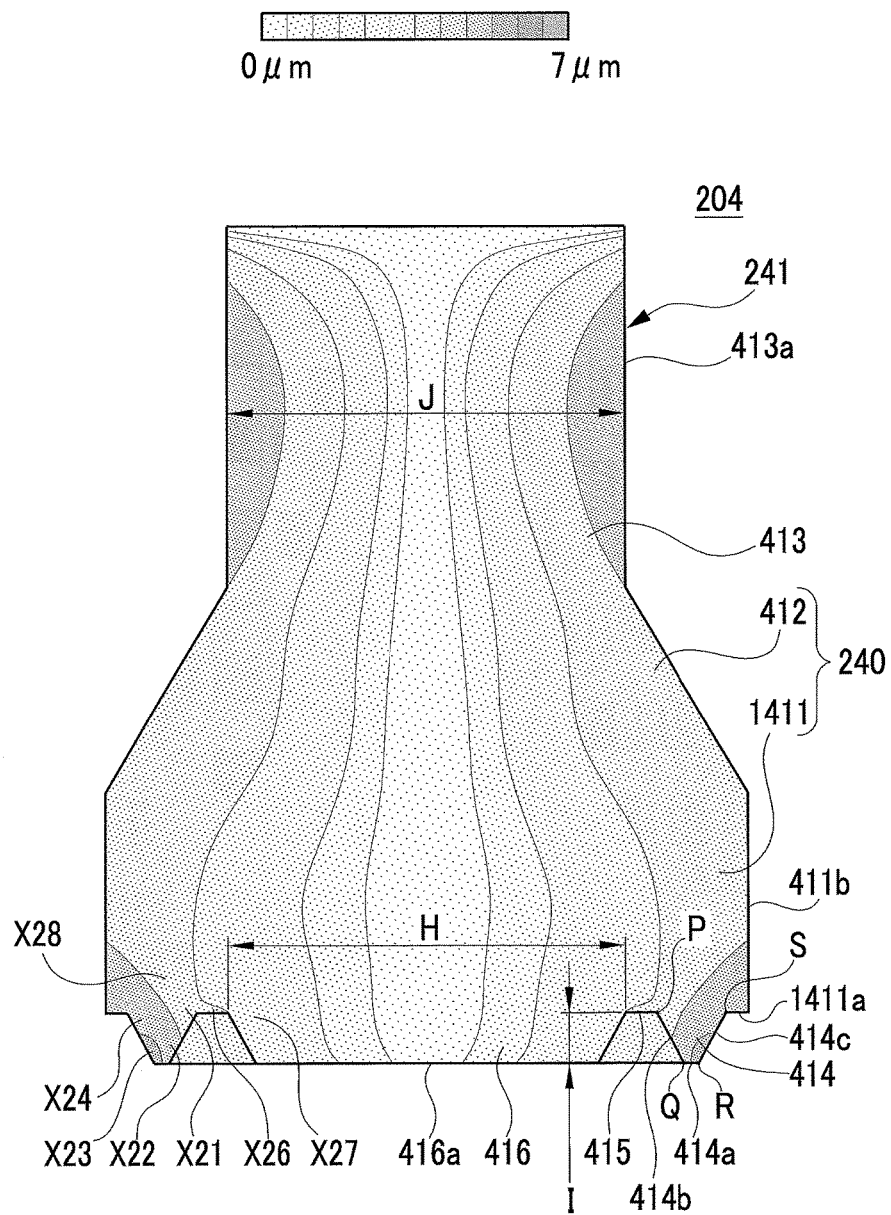
FIG. 10 is a view showing an analysis result of a displacement amount in the example 1.

The displacement amount of the parts P to S and their surroundings of the example 1 indicated with X21 to X24 in FIG. 10 are smaller than the displacement amount of the parts P to S and their surroundings of the example 10 indicated with X11 to X14 in FIG. 19, and therefore it is confirmed that deformation of the annular sealing protrusion 414 is smaller in the example 1 than in the example 10. As shown in FIG. 23, in the example 10, the displacement amount of the annular sealing surface 414a is 6.175 μm. This displacement amount is $6.18 \times 10^{-2}$ times of the radial width B of the annular sealing surface 414a, or $12.40 \times 10^{-4}$ times of the widthwise mean diameter A. On the other hand, in the example 1, the displacement amount of the annular sealing surface 414a is 5.064 μm. This displacement amount is $5.06 \times 10^{-2}$ times of the radial width B of the annular sealing surface 414a, or $10.10 \times 10^{-4}$ times of the widthwise mean diameter A. Accordingly, providing the protrusion 416 in the example 1 can reduce the displacement amount of the annular sealing surface 414a to 82% of the displacement amount of the annular sealing surface 414a in the example 10.

Further, in the example 1, the displacement amount of a portion above the part P of the annular sealing protrusion 414 (X26 in FIG. 10) is smaller than the displacement amount of a portion above the part P in the example 10 (see X16 in FIG. 19). In the example 1, furthermore, as indicated with X26 and X27 in FIG. 10, the displacement amount varies more concentrically about the axis than the example 10. Accordingly, in the example 1, it is confirmed that the end face 1411a and its surroundings of the main part 241 are hardly deformed in a radially outer direction (or easily deformed in a vertical direction in which the sealing load acts) than the example 10.

As a result, the valve element of the example 1 is provided with the protrusion 416, and thus it is restrained that the end face 1411a is curved to be deformed toward the valve seat and that the annular sealing protrusion 414 is flexed to be deformed radially outwards, leading to reduction in the displacement amount of the annular sealing surface 414a. This is conceivably because in the example 1, a center part of the columnar part 1411 is reinforced by the protrusion 416, and thus the rigidity is increased as compared to the example 10.

The present inventors have formed the valve element 204 shown in FIG. 5 based on the example 1 and conducted a particle test for the valve element 204. The test result is shown in FIG. 24. The method of the particle test is similar to the above mentioned particle test, and therefore the explanation is omitted.

As shown in FIG. 24, the valve element 204 is measured with 4.44 particles per 1 mL during the particle test. Namely, the valve element 204 generates less particles than the valve element 104. Further, in the valve element 204, the total number of particles measured during the particle test is as few as one fourth of the particles measured in the valve element 104. Accordingly, the valve element 204 is provided with the protrusion 416 and thus can reduce the number of particles.

Figure 28:
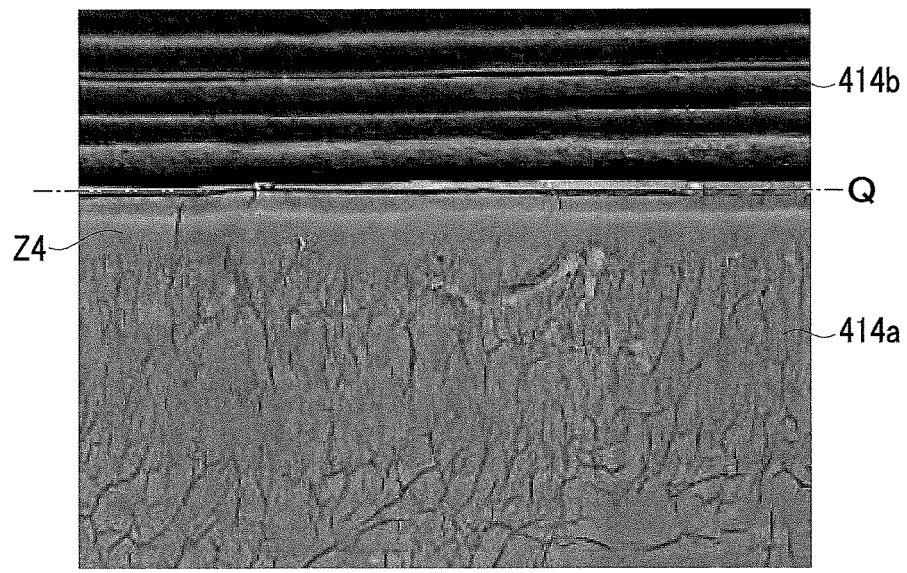
FIG. 28 is a microphotograph image of the annular sealing surface photographed after the particle test for the valve element in the example 1 in FIG. 5.
Figure 29:
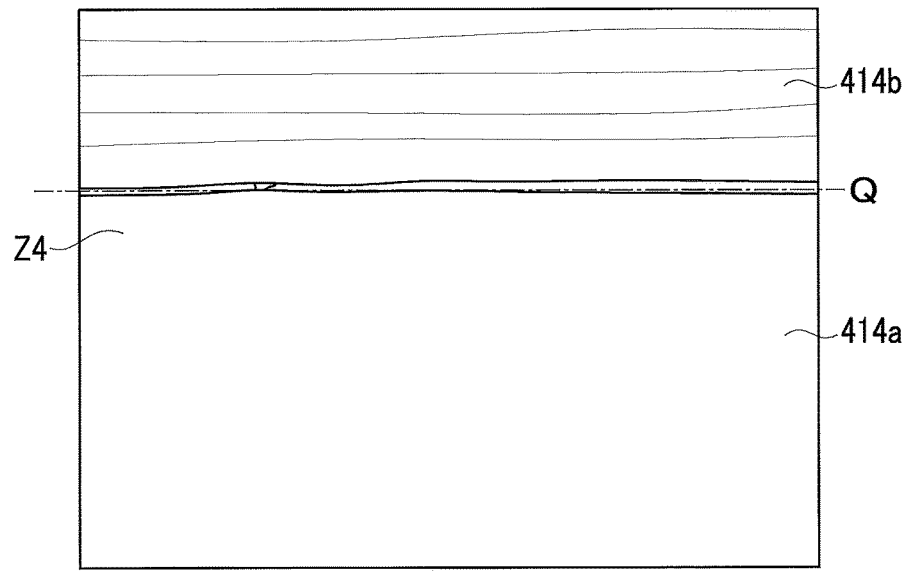
FIG. 29 is a drawing image of the microphotograph image shown in FIG. 28.

The present inventors have photographed a microphotograph of the annular sealing surface 414a of the valve element 204 after termination of the particle test. When a magnification of 500 times is set for the microphotograph, the valve element 204 is not confirmed with burrs on the parts Q and R of the annular sealing surface 414a. Further, the present inventors have raised the magnification from 500 times to 2000 times for the microphotograph and studied a state of the part Q and its surroundings of the annular sealing surface 414a in the valve element 204. The microphotograph image and a drawing image of the valve element 204 are shown in FIGS. 28 and 29. As indicated with Z4 in FIGS. 28 and 29, the valve element 204 has no wrinkles, scratches, and burrs confirmed at the part Q of the annular sealing surface 414a. More than that, in the valve element 204, a surface of the part Q is leveled to smoothen the unevenness. Therefore, the valve element 204 can restrain or prevent generation of minute particles which cannot be measured by the particle counter as well as particles which are measurable by the particle counter.

<(d) Effect of an Annular Recessed Groove Influencing on a Displacement Amount of an Annular Sealing Surface>

The examples 8 and 9, which are different only in presence or absence of the annular recessed groove 415 as shown in FIG. 3, are compared. In the example 8, the annular recessed groove 1144 is formed between the protrusion 1143 and the annular sealing protrusion 414. The protrusion 1143 is formed to have a basal end part diameter of 4 mm and the height I of 0.4 mm. In the example 9, an annular recessed groove is not formed between the protrusion 7416 and the annular sealing protrusion 414. The height I of the protrusion 7416 is equal to the protrusion 1143 in the example 8.

Figure 18:
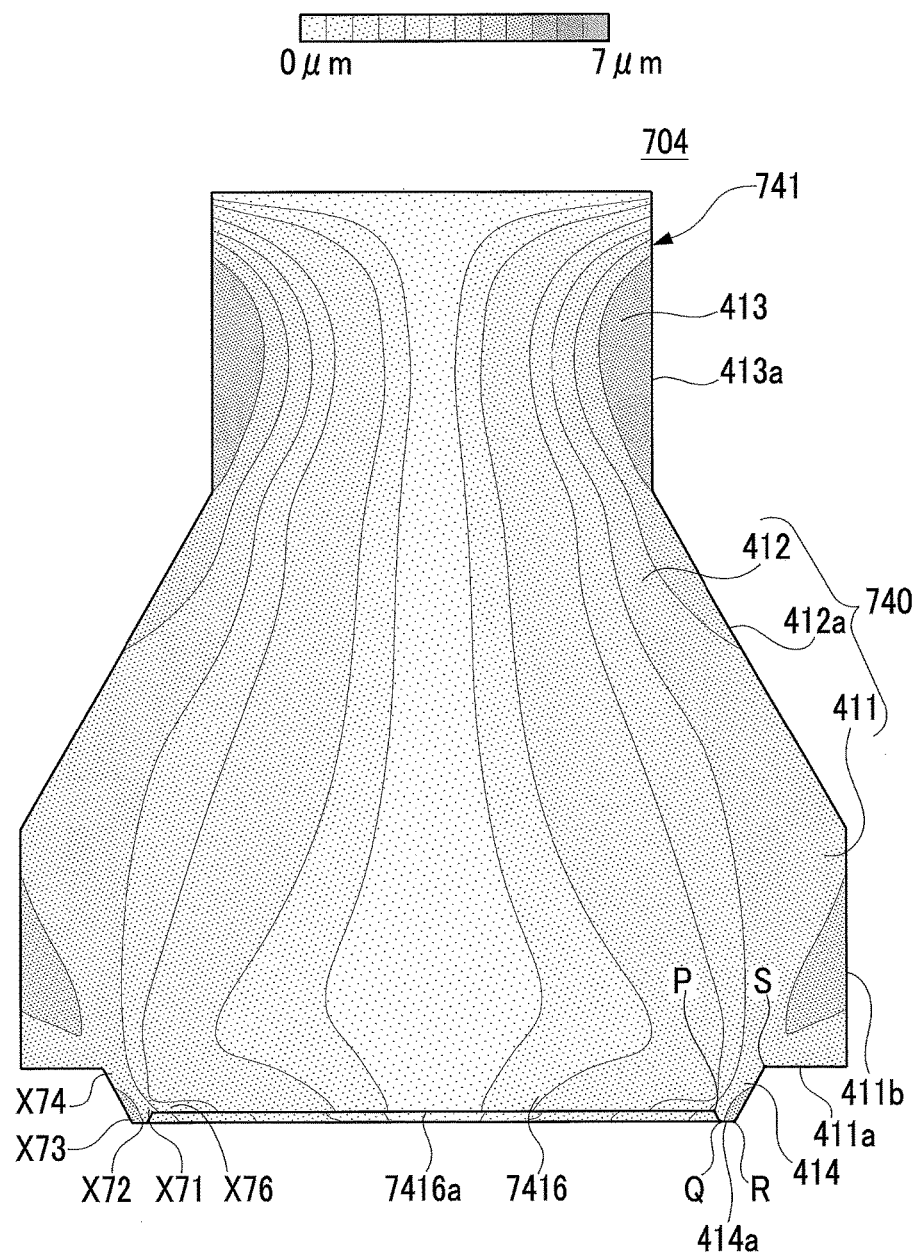
FIG. 18 is a view showing an analysis result of a displacement amount in the example 9.

FIG. 18 shows an analysis result of the displacement amount in the example 9. As indicated with X76, in the main part 741, deformation generated radially outwards in the protrusion 7416 is directly transmitted to the annular sealing protrusion 414. Therefore, as indicated with X71 to X74 in the figure, the annular sealing protrusion 414 is pressed radially outwards by the protrusion 7416. As shown in FIG. 23, in the example 9, the displacement amount of the annular sealing surface 414a is 4.302 μm. This displacement amount is $8.60 \times 10^{-4}$ times of the widthwise mean diameter A of the annular sealing surface 414a, or $4.30 \times 10^{-2}$ times of the radial width B.

Figure 17:
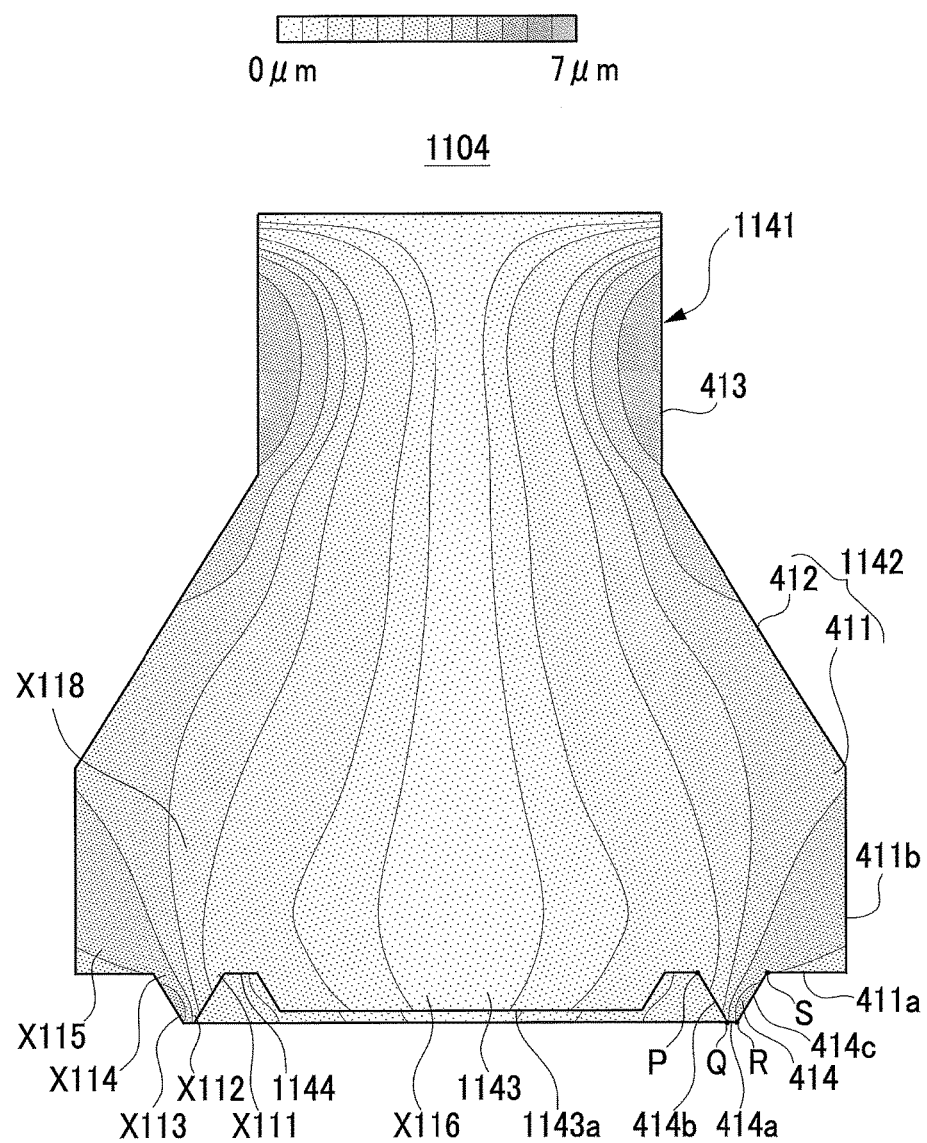
FIG. 17 is a view showing an analysis result of a displacement amount in the example 8.

FIG. 17 shows an analysis result of the displacement amount in the example 8. In the main part 1141, deformation generated radially outwards in the protrusion 1143 is hardly transmitted through the annular recessed groove 1144 to the annular sealing protrusion 414. Therefore, as indicated with X111 to X115 in the figure, the annular sealing protrusion 414 is deformed mainly in the vertical direction, and the annular sealing surface 414a is pressed against the valve seat surface 24a in an almost vertical direction. As shown in FIG. 23, in the example 8, the displacement amount of the annular sealing surface 414a is 3.736 μm. This displacement amount is $7.47 \times 10^{-4}$ times of the widthwise mean diameter A of the annular sealing surface 414a, or $3.74 \times 10^{-2}$ times of the radial width B.

As mentioned above, the valve element has the annular recessed groove formed between the protrusion and the annular sealing protrusion, and hence the displacement amount of the annular sealing surface in the radially outer direction can be reduced more than the valve element which includes only the protrusion.

<(e) Effect of a Basal End Part Diameter H Influencing on a Displacement Amount of an Annular Sealing Surface>

The examples 1 and 13, which are different only in the basal end part diameter H as shown in FIG. 3, are compared. In the example 1, the basal end part diameter H of the protrusion 416 is determined to be 4 mm as equal to the thin part diameter J. Further, in the example 13, the basal end part diameter H of the protrusion 944 is determined to be 2 mm which is smaller than the thin part diameter J (4 mm) The annular recessed groove 415 of the example 1 is formed narrower than the annular recessed groove 945 of the example 13.

Figure 22:
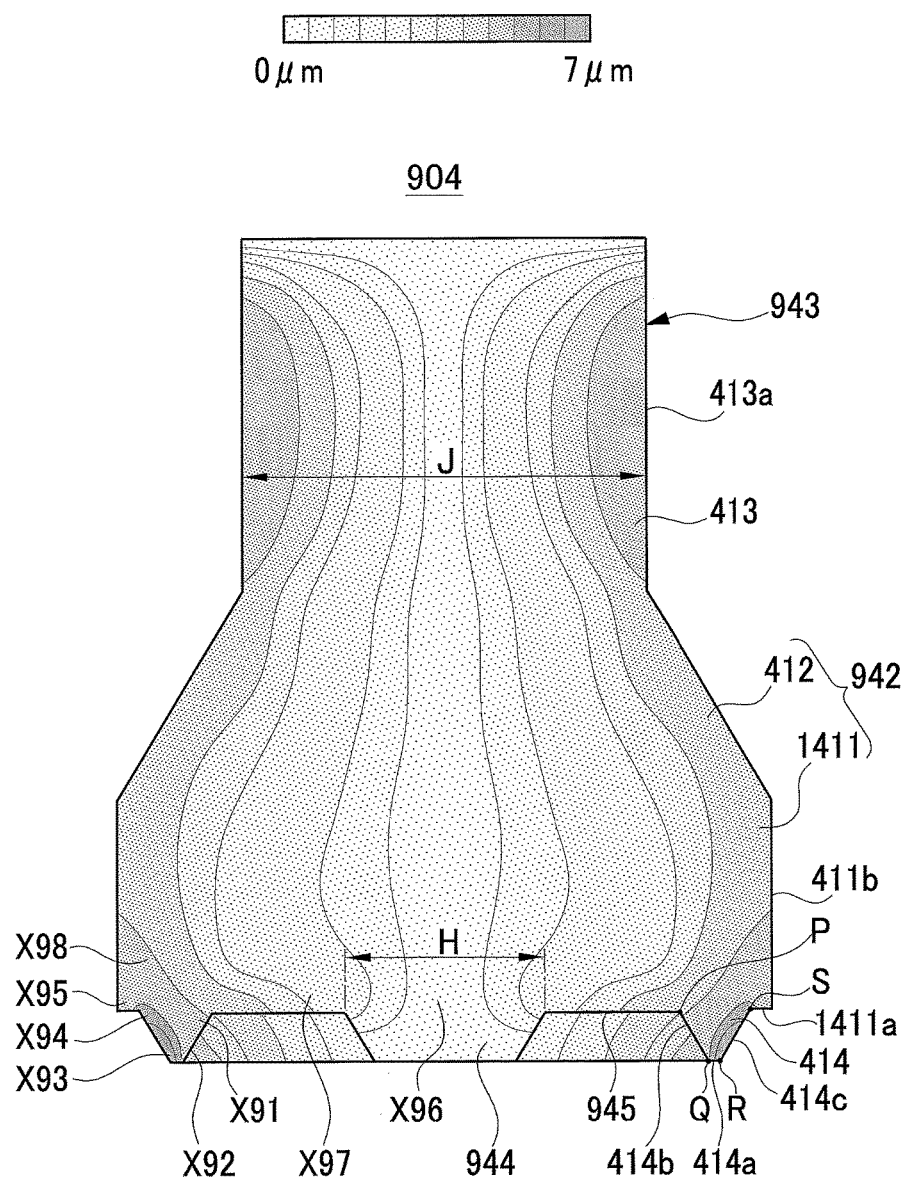
FIG. 22 is a view showing an analysis result of a displacement amount in the example 13.

FIG. 22 shows a result of the displacement amount analysis of the example 13. As indicated with X96 in the figure, the main part 943 is deformed in a valve seating direction in a region of the protrusion 944. However, as indicated with X97, in the main part 943, deformation in a radially outer direction is generated in a portion outside the protrusion 944 and inside the outer peripheral surface 413a of the neck part 413. That deformation is, as indicated with X98 in the figure, directly transmitted to the outer peripheral surface 411b of the columnar part 1411 through an upper part above the annular sealing protrusion 414 in the figure. Further, as indicated with X91 to X94 in the figure, the annular sealing protrusion 414 has large deformation amount larger on the outer peripheral surface 414c than on the inner peripheral surface 414b. As shown in FIG. 23, the displacement amount of the annular sealing surface 414a is 6.162 μm in the example 13. This displacement amount is $12.30 \times 10^{-4}$ times of the widthwise mean diameter A of the annular sealing surface 414a, or $6.16 \times 10^{-2}$ times of the radial width B.

On the other hand, as shown in FIG. 10, in the example 1, the displacement amount varies concentrically as a whole about an axis of the main part 241 as compared with the example 13. As indicated with X21 to X26 in the figure, in the valve element 204, the displacement amount at a portion outside the part P of the annular sealing protrusion 414 is smaller than the example 13. Further, as indicated with X21 to X24, in the valve element 204, each displacement amount at the parts P, Q, R, and S is smaller than the example 13. As shown in FIG. 23, the displacement amount of the annular sealing surface 414a is 5.064 μm in the example 1. This displacement amount is $10.10 \times 10^{-4}$ times of the widthwise mean diameter A of the annular sealing surface 414a, or $5.06 \times 10^{-2}$ times of the radial width B.

Accordingly, the valve element is arranged to have the basal end part diameter H to be equal to or more than the thin part diameter J, so that the displacement amount of the annular sealing surface is reduced. This is conceivably because the protrusion 416 can receive and widely disperse the whole load from the drive section.

<(f) Effect of a Height I of a Protrusion Influencing on a Displacement Amount of an Annular Sealing Surface>

Figure 20:
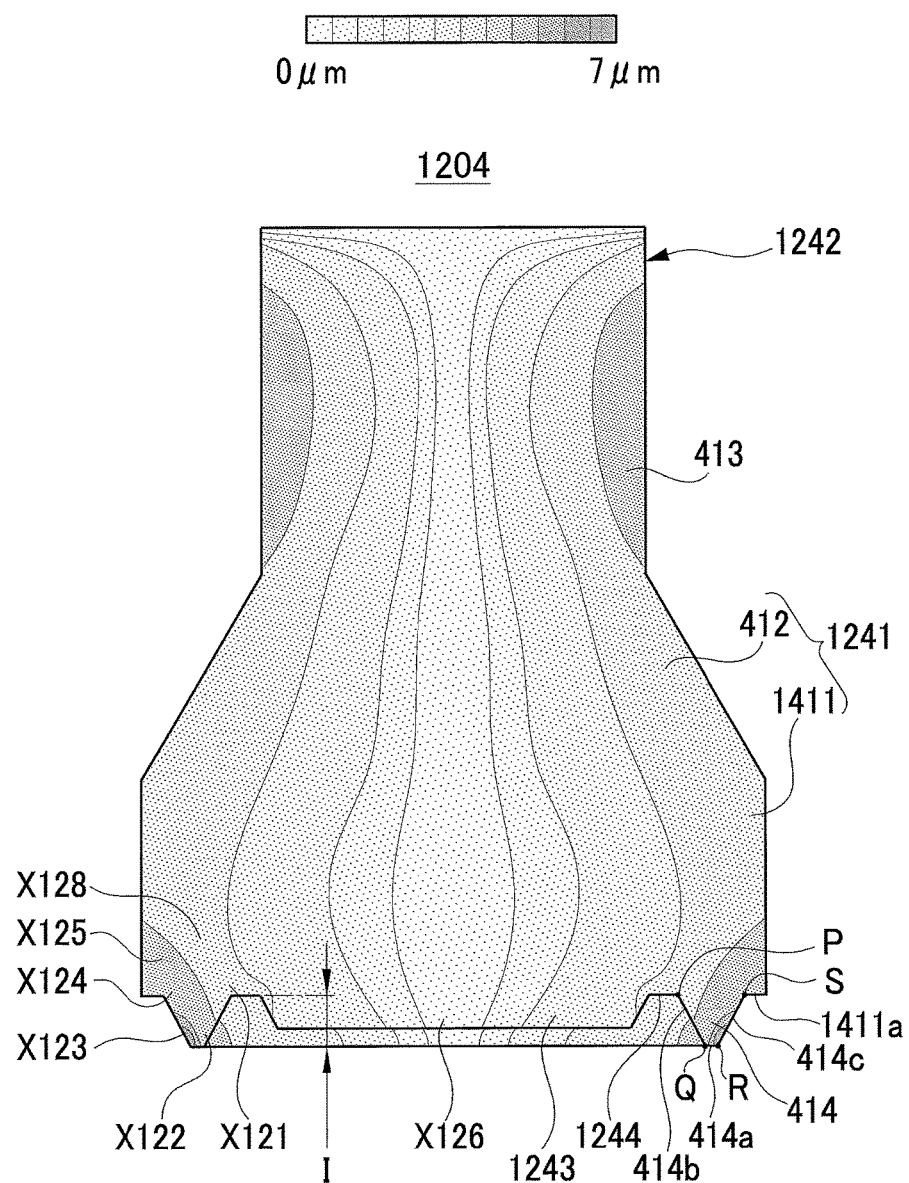
FIG. 20 is a view showing an analysis result of a displacement amount in the example 11.
Figure 21:
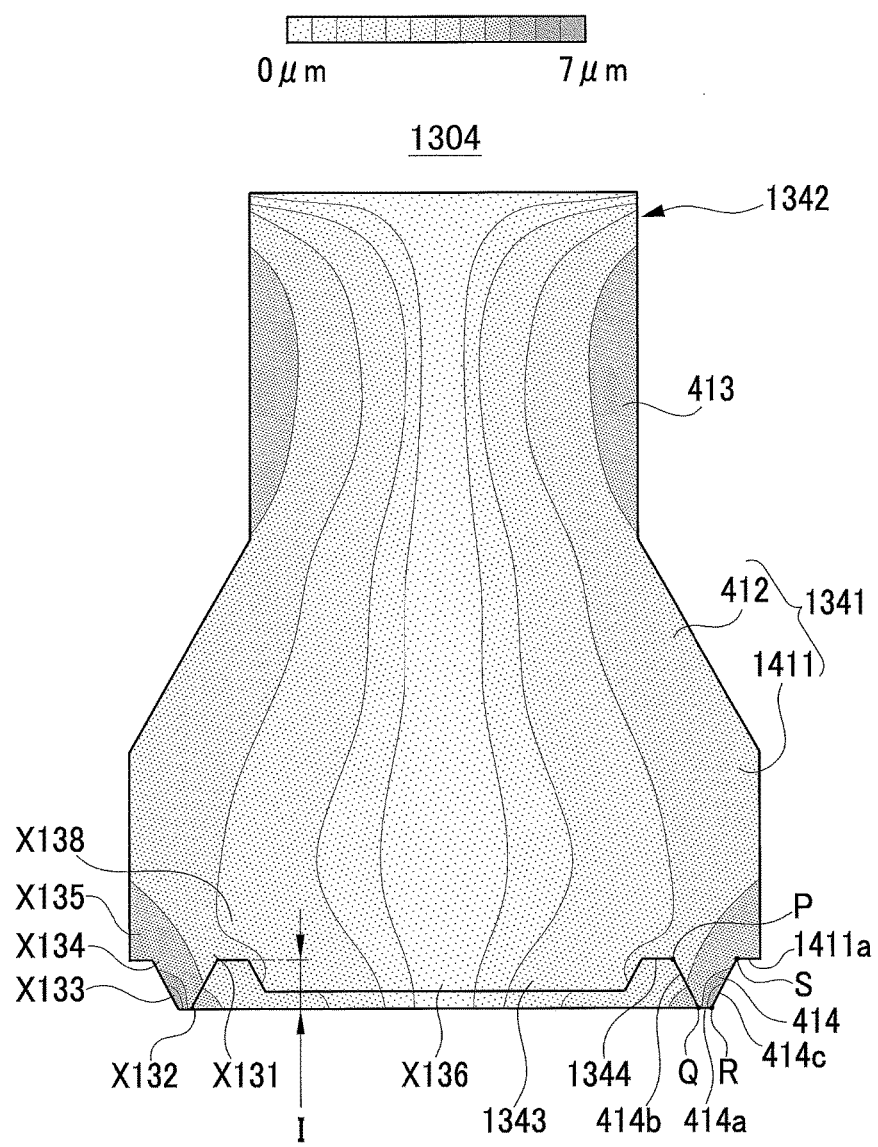
FIG. 21 is a view showing an analysis result of a displacement amount in the example 12.

The examples 1, 11, and 12, which are different only in the height I of the protrusion as shown in FIG. 3, are compared. In the example 1, the height I of the protrusion 416 is 0.5 mm which is equal to the height C of the annular sealing protrusion 414. In the example 11, the height I of the protrusion 1243 is 0.35 mm which is 0.7 times of the height C of the annular sealing protrusion 414. In the example 12, the height I of the protrusion 1343 is 0.3 mm which is 0.6 times of the height C of the annular sealing protrusion 414. FIGS. 10, 20, and 21 show each analysis result of the displacement amount analyses of the examples 1, 11, and 12.

As indicated with X26 and X27 in FIG. 10, in the example 1, deformation of the protrusion 416 is obstructed by the annular recessed groove 415 and thus hardly transmitted to the annular sealing protrusion 414, so that the annular sealing protrusion 414 is deformed mainly in the vertical direction. On the other hand, as indicated with X126 and X128 in FIG. 20 and X138 in FIG. 21, in the examples 11 and 12, deformation of the protrusions 1243 and 1343 in a radially outer direction is easily transmitted to a portion above the annular sealing protrusion 414 over the annular recessed grooves 1244 and 1344. Further, as indicated with X123 in FIG. 20, the example 11 has the displacement amount at the part R larger than the example 1. Furthermore, as indicated with X133 in FIG. 21, in the example 12, the displacement amount at the outer peripheral surface 414c of the annular sealing protrusion 414 is larger than the examples 1 and 10. As shown in FIG. 23, each of the displacement amount of the annular sealing surface 414a is 5.064 μm in the example 1, 5.644 μm in the example 11, and 5.678 μm in the example 12. Accordingly, the higher the height I of the protrusion 416 is, the more the displacement amount of the annular sealing surface 414a can be reduced. This is conceivably because the protrusion with the high height I can widely disperse the deformation and restrain the deformation amount which is to be transmitted to the annular sealing surface 414a. Further, it is conceived that the annular recessed groove is formed deep, and therefore deformation of the protrusion is hardly transmitted to the annular sealing protrusion.

<(g) Effect of a Combination of an End Face Diameter D and a Thickness F Influencing on a Displacement Amount of an Annular Sealing Surface>

The examples 2 and 3, which are different in the end face diameter D and the thickness F as shown in FIG. 3, are compared. In the example 2, the end face diameter D is 7.5 mm and the thickness F is 4.5 mm. In the example 3, the end face diameter D is 8.5 mm and the thickness F is 5.4 mm FIGS. 11 and 12 show analysis results of displacement amount of the examples 2 and 3.

Figure 12:
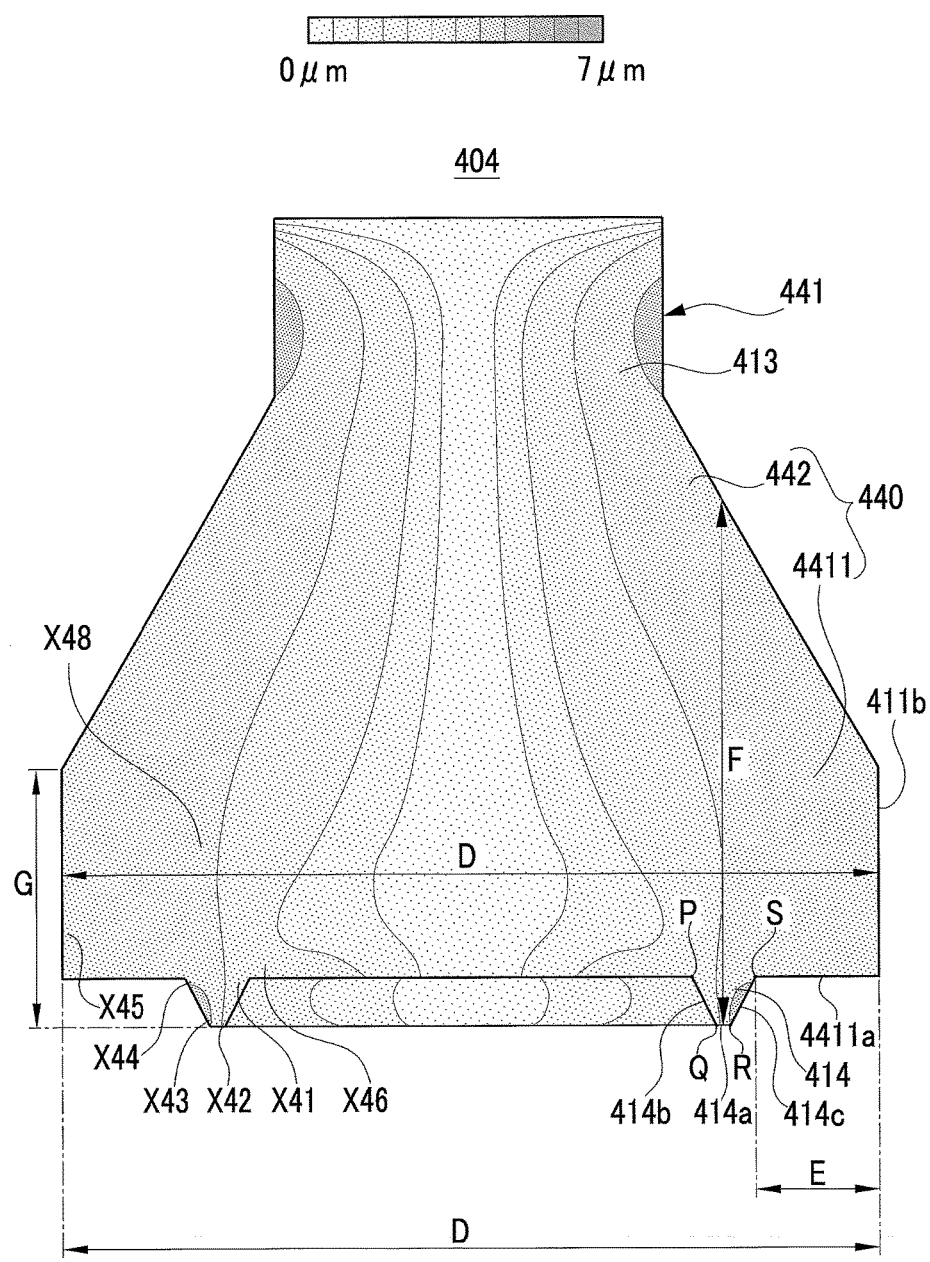
FIG. 12 is a view showing an analysis result of a displacement amount in the example 3.

In the example 3, each displacement amount of the parts P, Q, R, and S indicated with X41 to X44 in FIG. 12 is smaller than the example 2 (see X31 to X35 in FIG. 11), and the annular sealing protrusion 414 is deformed in the vertical direction. Further, the valve part 440 of the example 3 is changed its displacement amount more concentrically about an axis than the valve part 340 of the example 2. As shown in FIG. 23, in the example 2, the displacement amount of the annular sealing surface 414a is 4.037 This displacement amount is $8.07 \times 10^{-4}$ times of the widthwise mean diameter A of the annular sealing surface 414a, or $4.04 \times 10^{-2}$ times of the radial width B. On the other hand, in the example 3, the displacement amount of the annular sealing surface 414a is 3.224 μm. This displacement amount is $6.45 \times 10^{-4}$ times of the widthwise mean diameter A of the annular sealing surface 414a, or $3.22 \times 10^{-2}$ times of the radial width B.

Therefore, in the example 3, deformation of the columnar part 4411 and the end face 4411a is smaller than the example 2, and the annular sealing protrusion 414 can be vertically pressed against the valve seat surface 24a. Further, in the example 3, the annular sealing protrusion 414 is vertically pressed against the valve seat surface 24a and less deformed than the example 2, so that the displacement amount of the annular sealing surface 414a is reduced. This is conceivably because the end face diameter D and the thickness F are larger in the example 3 than in the example 2, and hence the load from the drive section 3 is widely dispersed at a position apart from the end face 4411a and the annular sealing protrusion 414 can be vertically pressed against the valve seat 24.

The present inventors have formed the valve elements 304 and 404 based on the examples 2 and 3 and performed the particle test. The method of the particle test is similar to the above mentioned particle test, and hence the explanation thereof is omitted. Results of the particle test are shown in FIG. 24.

As shown in FIG. 24, in the valve element 304, 2.22 particles per 1 mL are measured during the particle test. This number of particles is reduced to about one ninth of the number in the example 10. On the other hand, as shown in FIG. 24, in the valve element 404, there is no particle measured during the particle test. Accordingly, the larger the end face diameter D and the thickness F of the columnar part 411 are formed, the larger the effect of restraining generation of particles becomes. This is because the rigidity is increased.

The present inventors also photographed microphotographs of the annular sealing surface 414a of the valve elements 304 and 404 which are terminated with the particle test with a magnification of 2000 times. In both of the valve elements 304 and 404, no burrs are confirmed on the annular sealing surface 414a. The valve element 404 has a smooth surface on the part Q as compared with the valve element 304. This is conceivably because in the valve element 404, the annular sealing protrusion 414 is pressed and leveled more vertically than in the valve element 304.

Accordingly, in the valve element, when the end face diameter D and the thickness F are made large, generation of the minute particles which cannot be measured by the particle counter can be restrained or prevented as well as preventing particles which are measurable by the particle counter.

<(h) Effect of a Combination of a Protrusion and an End Face Diameter D Influencing on a Displacement Amount of an Annular Sealing Surface>

Incidentally, when the end face diameter D is increased as embodied in the example 3, the diaphragm chamber 22 is made large, leading to increase in size of the body 21. Further, a fluid pressure acting on the end face 4411a is increased, and thereby the drive section is made large to increase the sealing load. On the other hand, when the thickness F is made large, a fluid stagnation part is likely to be formed in the diaphragm chamber 22. Thereby, the diaphragm chamber 22 is enlarged, leading to increase in size of the body 21. In response to this, the present inventors have analyzed the displacement amount of the example 4 in which the end face diameter D and the thickness F are smaller than the example 3 and the protrusion 416 is provided as shown in FIG. 3. An analysis result of the displacement amount of the valve element 4 of the example 4 is shown in FIG. 13.

As shown in FIG. 3, the end face diameter D is 8.5 mm and the thickness F is 5.4 mm, but no protrusion is provided in the example 3. The example 4 has the end face diameter D of 7.5 mm and the thickness F of 4.5 mm, and is provided with the protrusion 416. FIGS. 12 and 13 show analysis results of the displacement amount of the examples 3 and 4.

Figure 13:
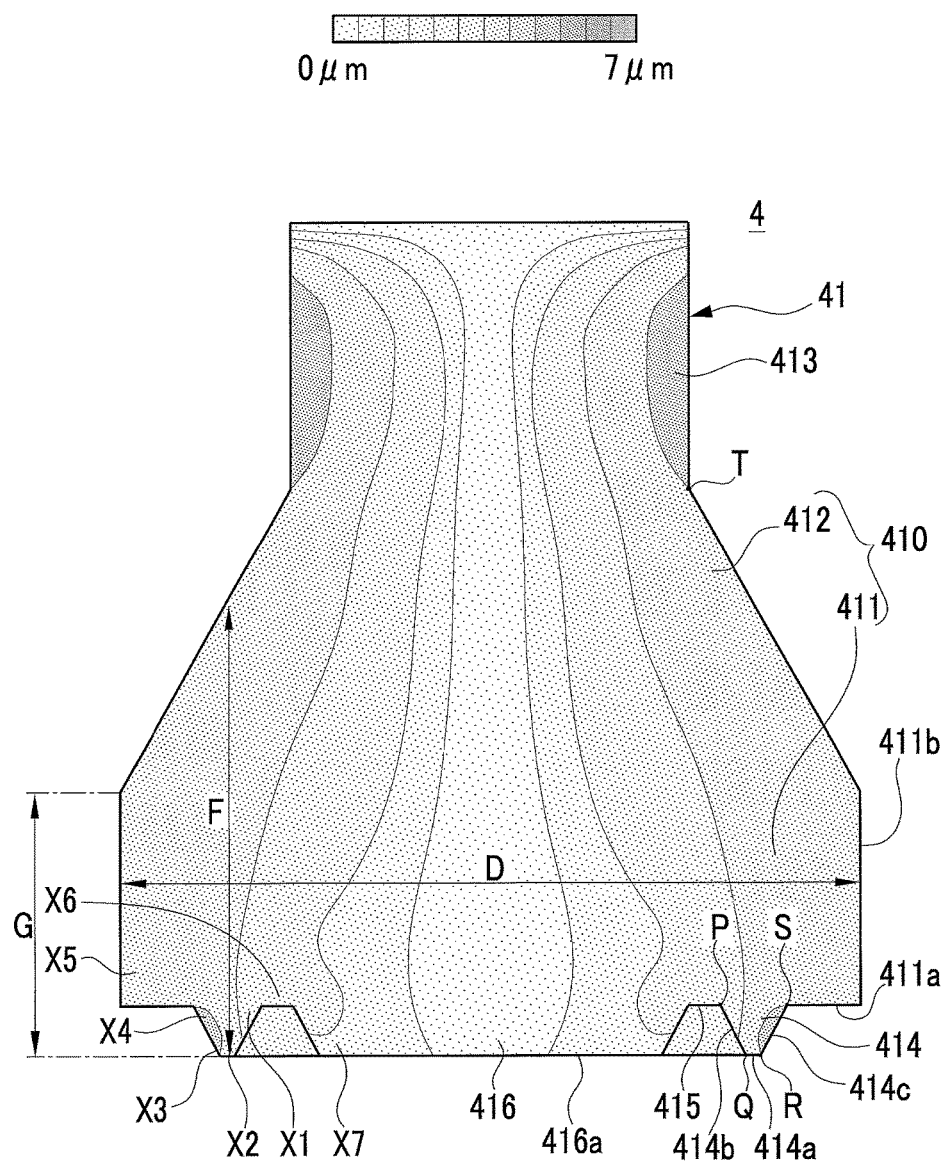
FIG. 13 is a view showing an analysis result of a displacement amount in the example 4.

As shown in FIG. 13, the main part 41 of the example 4 has high rigidity at its center part owing to the protrusion 416, and thus the center part is hardly deformed in the radially outer direction as compared with the example 3 (see FIG. 12). Further, as indicated with X6 and X7 in FIG. 13, in the main part 41, even when the protrusion 416 is deformed in the radially outer direction, that deformation is hardly transmitted to the annular sealing protrusion 414 thanks to the annular recessed groove 415. Moreover, in the main part 41 of the example 4, as indicated with X1 to X4 in FIG. 13, each displacement amount of the parts P, Q, R, and S of the annular sealing protrusion 414 is reduced as much as the example 3 (see X41 to X44 in FIG. 12). As shown in FIG. 23, the displacement amount of the annular sealing surface 414a in the example 4 is 3.687 μm. In the example 3, the displacement amount of the annular sealing surface 414a is 3.224 μm.

Consequently, in the example 4, even when the end face diameter D is made small to be about 0.88 times of the example 3 and the thickness F is made small to be about 0.83 times of the example 3, the displacement amount of the annular sealing surface 414a is reduced as similar to the example 3 by providing the protrusion 416 and the annular recessed groove 415. Accordingly, the example 4 can make the size of the drive section 3 and the body 21 smaller than the example 3. Thus, in the example 4, the displacement amount of the annular sealing surface 414a is reduced to restrain abrasion and generation of particles, and a valve can be made compact at the same time. Moreover, deterioration in the main part 41 is prevented in the example 4, and therefore, an initial sealing force can be maintained for a long period of time, leading to a long interval for maintenance of the valve.

<(i) Effect of a Combination of a Protrusion, a Thickness F, and a Height G Influencing on a Displacement Amount of an Annular Sealing Surface>

The examples 4, 5, and 6, which are different in the thickness F and the height G as shown in FIG. 3, are compared. In the examples 4, 5, and 6, a position of the part T is similar and the protrusion 416 and the annular recessed groove 415 are provided as similar to one another. In the examples 4, 5, and 6, the thickness F is determined by the height G and an inclination angle of the shoulder portions 412, 543, and 643. In the example 4, the thickness F is 4.5 mm which is 0.9 times of the widthwise mean diameter A (5 mm) of the annular sealing surface 414a. Further, the height G is 2.65 mm in the example 4. In the example 5, the thickness F is 4.0 mm which is 0.8 times of the widthwise mean diameter A (5 mm) of the annular sealing surface 414a. Further, the height G is 2.15 mm in the example 5. In the example 6, the thickness F is 3.5 mm which is 0.7 times of the widthwise mean diameter A (5 mm) of the annular sealing surface 414a. Further, the height G is 1.65 mm in the example 6. Analysis results of the displacement amount of the valve elements 4, 504, and 604 of the examples 4 to 6 are shown in FIGS. 13 to 15.

Figure 14:
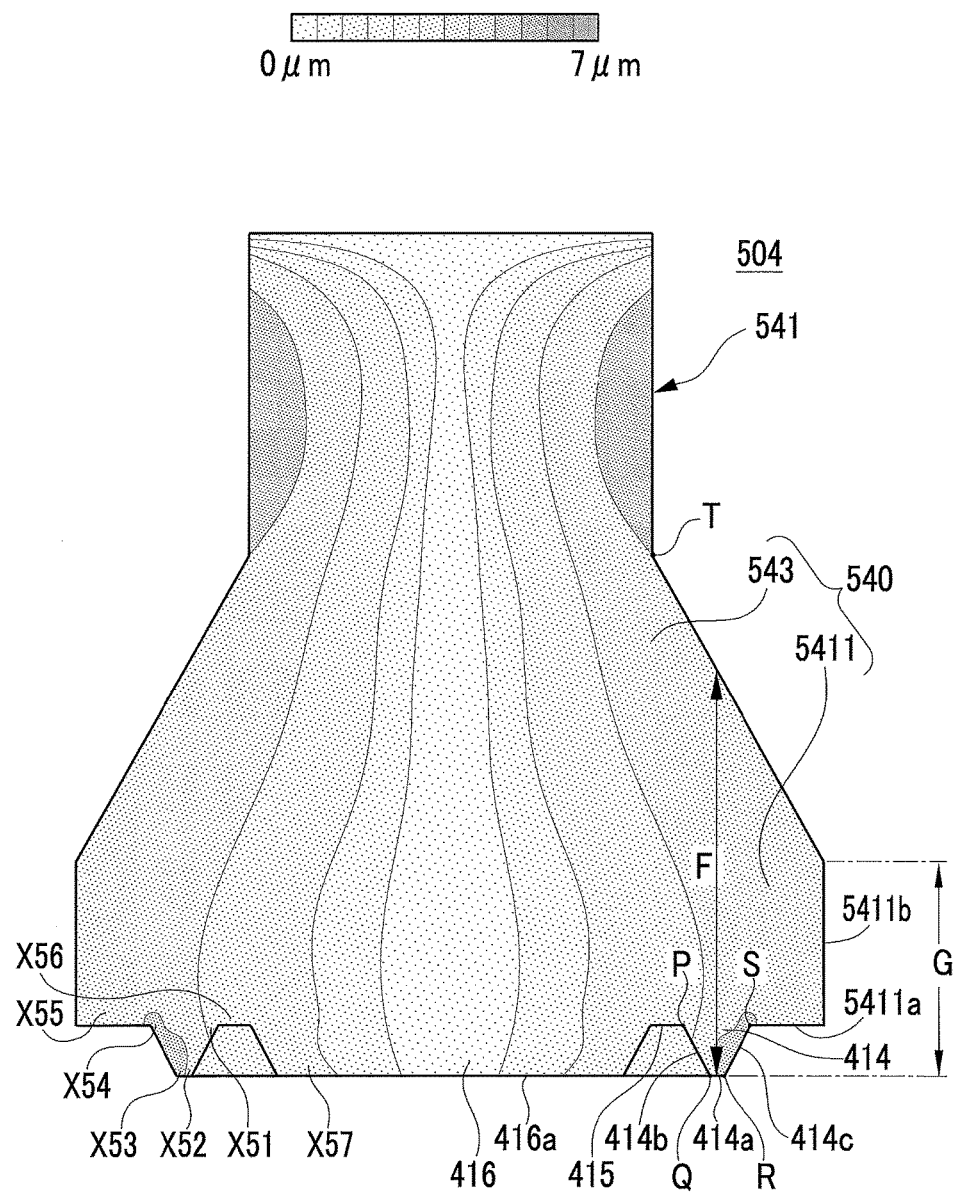
FIG. 14 is a view showing an analysis result of a displacement amount in the example 5.
Figure 15:
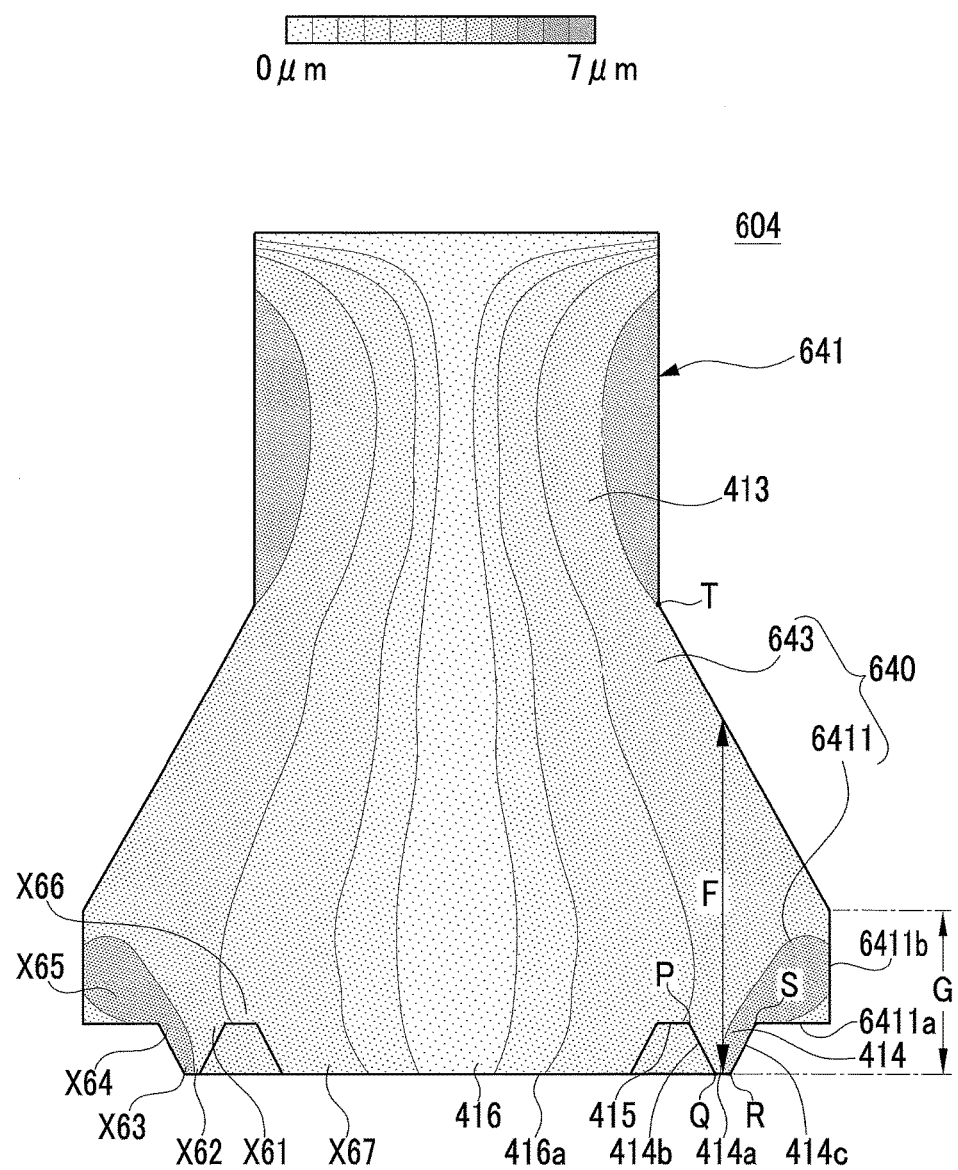
FIG. 15 is a view showing an analysis result of a displacement amount in the example 6.

As shown in FIGS. 13 to 15, in the examples 4 to 6, each center part of the valve main bodies 41, 541, and 641 is increased its rigidity by the protrusion 416 and is hardly deformed in a radially outer direction. The radially outward deformation generated in the protrusion 416 is hardly transmitted to the annular sealing protrusion 414 owing to the annular recessed groove 415. Further, as shown in FIGS. 13 to 15, in the valve main bodies 41, 541, and 641, their displacement amount are changed concentrically about an axis, and thus the main bodies are apt to be deformed in the vertical direction. As indicated with X5 to X7 in FIG. 13, X55 to X57 in FIG. 14, and X65 to X67 in FIG. 15, deformation on each of the end faces 411a, 5411a, and 6411a is restrained to the same amount, and the annular sealing protrusion 414 is pressed vertically against the valve seat surface 24a. Further, as indicated with X1 to X4 in FIG. 13, X51 to X54 in FIG. 14, and X61 to X64 in FIG. 15, in the examples 4 to 6, the displacement amount at the parts P, Q, R, and S are similar to one another, and the annular sealing protrusion 414 is deformed in the vertical direction. As shown in FIG. 23, the displacement amount of the annular sealing surface 414a in the example 4 is 3.687 μm. The displacement amount of the annular sealing surface 414a in the example 5 is 4.100 μm. The displacement amount of the annular sealing surface 414a in the example 6 is 4.685 μm.

Accordingly, even when the height G is made small and the volume of the diaphragm chamber is enlarged, the valve element can reduce the displacement amount of the annular sealing surface by increasing the inclination of the shoulder part to ensure the enough thickness F. Further, in the valve element, when the height G is low and the inclination of the shoulder part is large, the fluid is less stagnated in the diaphragm chamber. Thus, problems such as deterioration of the stagnated fluid and solidification of the fluid to become particles are rarely occurred.

<Relation Between a Displacement Amount of an Annular Sealing Surface and the Number of Particles>

According to the above mentioned particle test results, a relation between the displacement amount of the annular sealing surface and the number of particles is summarized and shown in FIG. 24. As shown in FIG. 24, when the displacement amount of the annular sealing surface 414a is gradually decreased to 6.175 μm, 5.064 μm, 4.037 μm, and 3.244 μm, the particle generation amount is decreased to 17.78, 4.44, 2.22, and 0. On the contrary, a sample with no measures taken, in which the displacement amount of the annular sealing surface 414a is over 6.175 and 9 μm or less, is increased its particle generation numbers to 797.8. Accordingly, when the displacement amount of the annular sealing surface 414a is reduced to 6.175 μm or less, generation of particles can be effectively restrained.

Especially, as shown in FIGS. 26 to 29, when the valve element 104 of the example 10 with the displacement amount of 6.175 μm and the valve element 204 of the example 1 with the displacement amount of 5.064 μm are compared, the annular sealing surface 414a is leveled and hardly generates burrs in the valve element 204. Therefore, it is conceivable that the valve element 204 in the example 1 can restrain or prevent generation of minute particles on the annular sealing surface 414a more effectively than the valve element 104 in the example 10. Accordingly, when the fluid control valve is configured to restrain the displacement amount of the annular sealing surface as small as possible, even if particles are downsized to lead a problem on manufacturing a semiconductor, it is possible to eliminate a cause of generating particles. Further, the life expectancy of the valve element is elongated and a burden of maintaining the fluid control valve 1 is lessened.

<Another Example>

The present inventors have also studied another configuration in which the end face 1411a of the diaphragm valve element 104 is made flat with no annular sealing protrusion 414, and a protrusion is provided along an outer periphery of an opening of the valve seat 24. In this configuration, it is not possible to reduce abrasion and particles generated in valve closing on the annular sealing surface as much as the diaphragm valve element 104.

B. Second Embodiment

Next, a fluid control valve according to a second embodiment of the present invention will be explained. The fluid control valve in the second embodiment only differs from the fluid control valve 1 of the first embodiment in the material of the valve element 4 (the example 4). Herein, a valve element of the second embodiment is assigned with a referential sign "4A," and other sings remain as same as the first embodiment.

A valve element 4A in the second embodiment is formed by cutting out a PFA-made round bar into the same shape with the diaphragm valve element 4 of the first embodiment. PFA has hardness higher than PTFE and is hardly abraded. Therefore, in the valve element 4A, as compared to the diaphragm valve element 4 in the first embodiment made of PTFE, the columnar part 411 and the annular sealing protrusion 414 are hardly deformed by the sealing load. Therefore, in the fluid control valve of the second embodiment, as compared to the fluid control valve 1 of the first embodiment, the annular sealing surface 414a of the valve element 4A is hardly rubbed against the valve seat surface 24a, and therefore abrasion caused by deformation of the valve element 4A in valve closing is restrained and generation of particles is prevented.

Herein, the present inventors have photographed microphotographs of each of the annular sealing surfaces 414a of the valve element 4A and the diaphragm valve element 4 at the initiation time before operation and after 5000 times of the valve opening and closing operation. The valve element 4A has less differences on the annular sealing surface 414a at the initiation time and at the time after 5000 times of the operation, and there are few wrinkles and scratches confirmed on the annular sealing surface 414a. On the other hand, after 5000 times of operation of the diaphragm valve element 4, there are confirmed minute wrinkles and scratches on an inner peripheral edge and its surroundings of the annular sealing surface 414a. Accordingly, by forming the annular sealing protrusion 414 by PFA, abrasion of the annular sealing surface 414a caused in valve closing can be restrained or prevented, and minute particles are hardly generated.

Further, the present inventors have conducted a test of collecting abrasion particles from the valve element 4A and the diaphragm valve element 4. A test device is configured with, in the order from an upstream side, a primary filter to remove foreign matters of 5 μm or more, an object to be tested (a fluid control valve attached with the valve element 4A or a fluid control valve attached with the diaphragm valve element 4), and a secondary filter to remove foreign matters of 50 nm or more. The test is conducted in such a way that the object to be tested is operated to perform 40000 times of the valve opening and closing operation while pure water is supplied by 30 ml per minute to the primary filter, and subsequently, the number of particles collected by the secondary filter is counted. The primary filter removes the foreign matters contained in pure water, and namely, the particles collected by the secondary filter are conceived to be the particles generated due to abrasion of the valve element 4 or 4A.

The test result shows that the fluid control valve attached with the diaphragm valve element 4 has the number of 41 collected abrasion particles. The fluid control valve attached with the valve element 4A has, on the other hand, 14 collected abrasion particles. Accordingly, the valve element 4A made of PFA can reduce the number of the collected abrasion particles by 65% from the diaphragm valve element 4 made of PTFE. From this test result, it is confirmed that the annular sealing protrusion 414 made of PFA generates less abrasion particles than the one made of PTFE.

C. Third Embodiment

Figure 31:
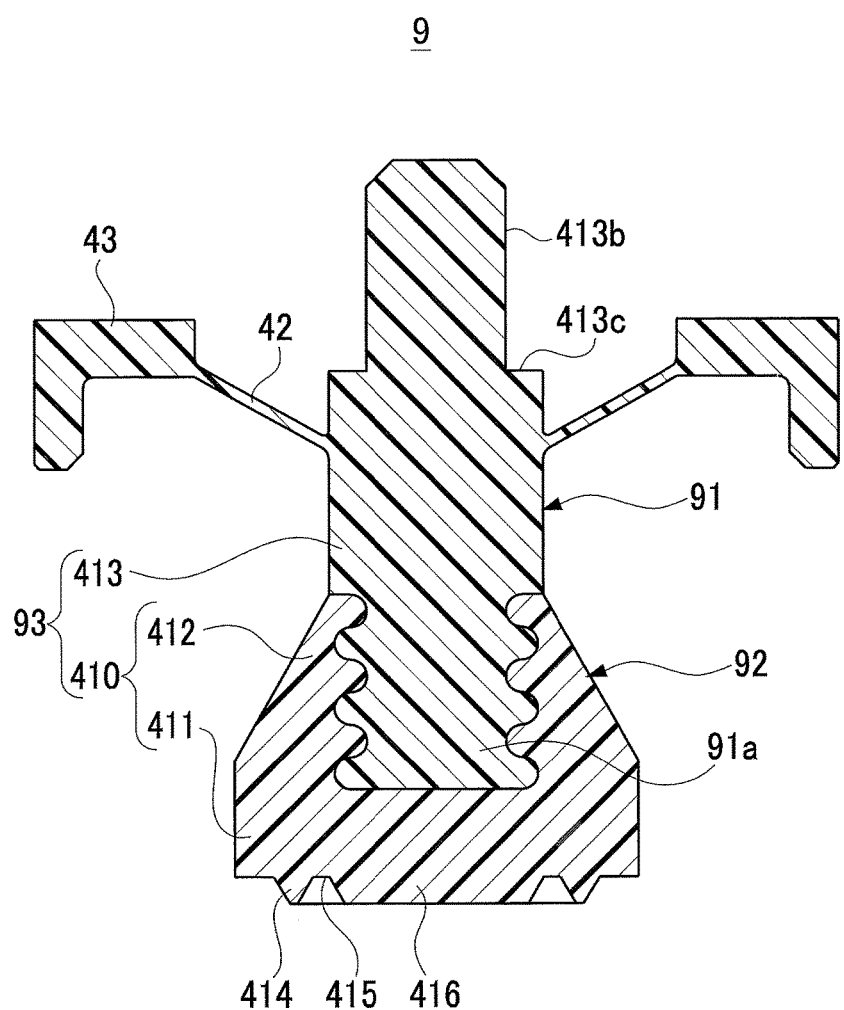
FIG. 31 is a sectional view of a valve element used for a fluid control valve according to a third embodiment of the present invention.
Figure 32:
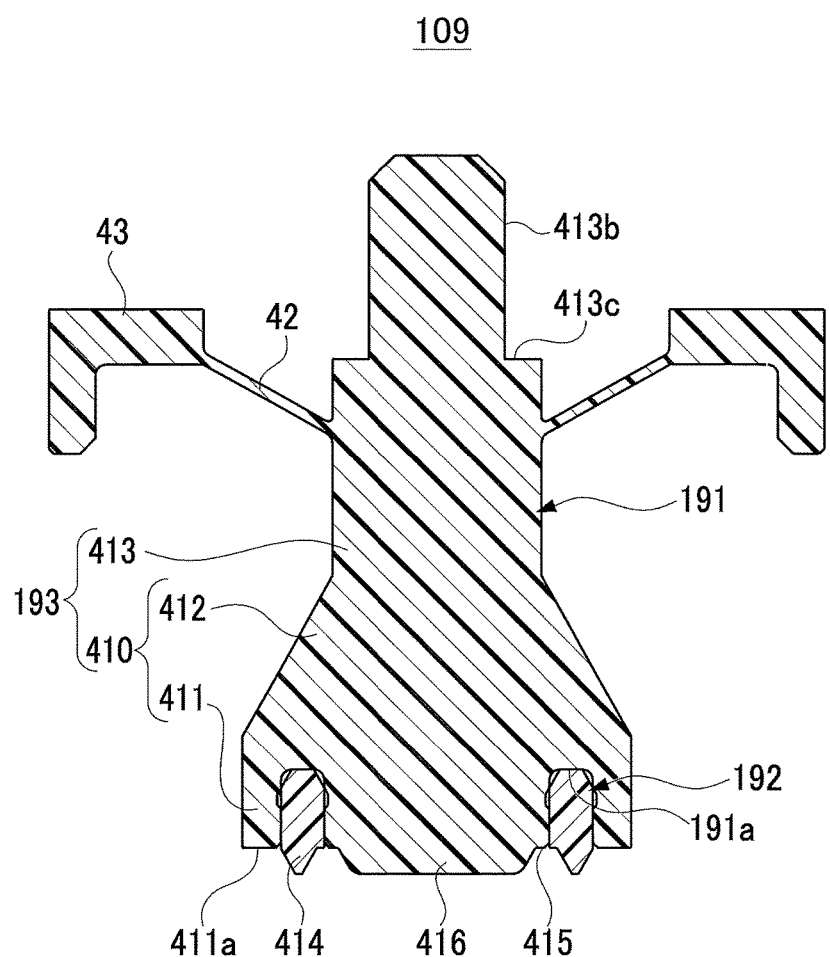
FIG. 32 is a sectional view showing a valve element in a first modified example.
Figure 33:
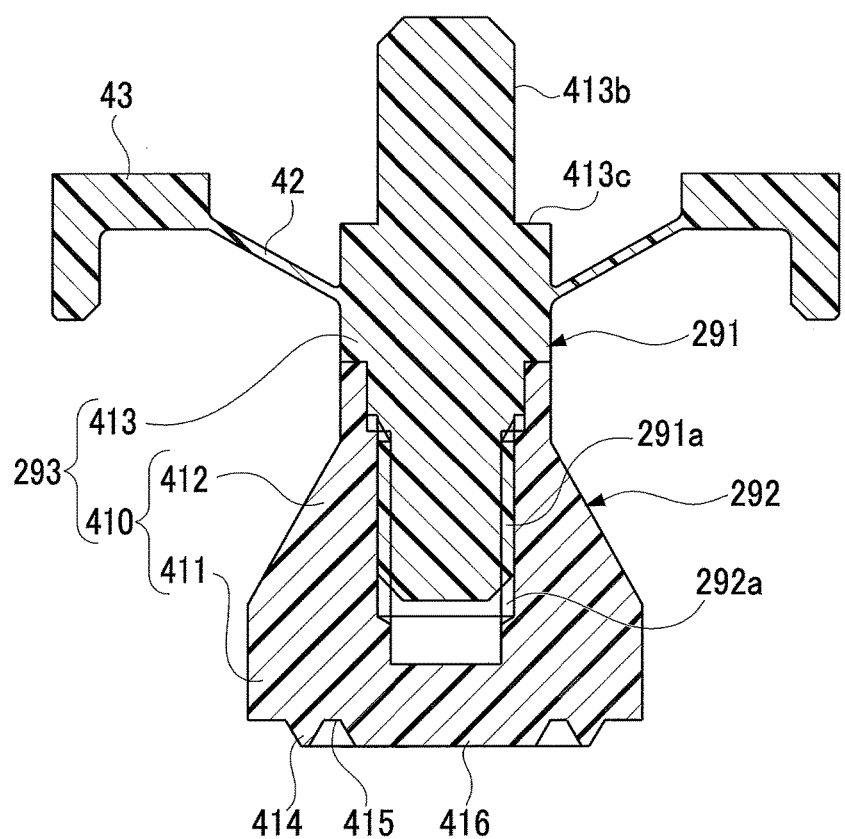
FIG. 33 is a sectional view showing a valve element in a second modified example.

Next, a fluid control valve according to a third embodiment of the present invention will be explained. FIG. 31 is a sectional view of a valve element 9 which will be used for the fluid control valve in the third embodiment of the present invention. FIGS. 32 and 33 show valve elements 109 and 209 of a first and second modified examples. The valve elements 9, 109, and 209 differ from the valve element 4A of the second embodiment in the configuration that each valve element is made up by coupling two components which are made of different materials, and other configuration is similar to those in the valve element 4A of the second embodiment. In the following explanation, the configuration corresponding to the second embodiment is assigned with the same referential signs with the second embodiment and the explanation thereof is appropriately omitted, and the explanation is made focus on the different features from the second embodiment.

As explained in the second embodiment, the valve element 4A is made of PFA, and hence abrasion on the annular sealing surface 414a caused in valve closing can be reduced and generation of abrasion particles can be restrained. However, PFA is difficult to be formed by cutting due to problems such as difficulty in obtaining the material. In response to this, as shown in FIG. 31, the valve element 9 of the third embodiment is divided into a first component 91 and a second component 92 between a neck part 413 and a shoulder part 412 of a main part 93 (a valve part 410). The first component 91 is made of PTFE and the second component 92 is made of PFA. The first component 91 and the second component 92 are coupled by insert molding. The first component 91 includes a web portion 42, an outer peripheral edge portion 43, and the neck part 413 of the main part 93. The second component 92 includes the shoulder part 412 and a columnar part 411 of the main part 93, an annular sealing protrusion 414, an annular recessed groove 415, and a protrusion 416.

PFA is applicable with fusion molding which is difficult in PTFE. Further, PFA has melting point lower than PTFE. On the other hand, PTFE is easily obtainable and is easier to be formed by cutting than PFA. Therefore, in the valve element 9, the first component 91 is formed by cutting out a round bar made of PTFE. The second component 92 is formed in such a way that a coupling protrusion 91a protruding in an axial direction of the first component 91 is inserted in a metal die and molten PFA is let flown around the coupling protrusion 91a and solidified. Accordingly, the columnar part 411, the annular sealing protrusion 414, the annular recessed groove 415, and the protrusion 416 of the second component 92 can be easily and accurately formed by fusion molding. Further, the first component 91 including the neck part 413 is made of resin (such as PTFE) having hardness lower than PFA while the second component 92 provided with the annular sealing protrusion 414 and coupled with the first component 91 is made of PFA, so that the valve element 9 including the annular sealing protrusion 414 made of PFA can be easily formed.

In the valve element 9, the first component 91 is joined to the second component 92 by insert molding, thus rarely creating a gap between the first and the second components 91 and 92. Furthermore, the valve element 9 has recesses and projections on an outer peripheral surface of the coupling protrusion 91a in a circumferential direction, and PFA is filled in those recesses and projections to couple the second component 92 with the first component 91. Accordingly, even when the fluid control valve is repeatedly operated to perform valve opening and closing, a gap is hardly created between the second component 92 and the first component 91. As a consequence, in the fluid control valve attached with the valve element 9, minute particles rarely get in between the first component 91 and the second component 92. Furthermore, a chemical liquid or the like is prevented from getting in between the first component 91 and the second component 92 and from being solidified to generate particles. Moreover, the valve element 9 includes the annular sealing protrusion 414 and the columnar part 411 which are made of PFA and hardly deformed, leading to restraint of abrasion on the annular sealing surface 414a in valve closing and reduction in particles.

The valve element 109 in the first modified example shown in FIG. 32 includes a first component 191 provided with a press-fitting groove 191a, which is annularly formed in an end face 411a (on a side facing the valve seat) and press-fitted with a ring-shaped second component 192. The annular sealing protrusion 414 is constituted by a second component 192. The first component 191 is made of Pith and the second component 192 is made of PFA. The annular sealing protrusion 414 of the valve element 109 is made of PFA and hardly deformed, and hence abrasion on the annular sealing surface 414a caused in valve closing is restrained and generation of particles is reduced. The valve element 109 has a possibility that a gap is created between the second component 192 and an inner wall of the press-fitting groove 191a and thus dirt or wastes get into the gap. Further, in the valve element 109, the second component 192 is press-fitted in the press-fitting groove 191a to couple the first component 191 with the second component 192, and thus there is a possibility that each dimension of the columnar part 411, the annular sealing protrusion 414, the annular recessed groove 415, and the protrusion 416 varies in products.

The valve element 209 of the second modified example shown in FIG. 33 differs from the valve element 9 of the third embodiment in the configuration that a first component 291 is provided with a protruding male threaded portion 291a and that the male threaded portion 291a is threaded with a female threaded portion 292a of a second component 292. The columnar part 411 and the annular sealing protrusion 414 of the valve element 209 are made of PFA and hardly deformed, so that abrasion on the annular sealing surface 414a caused in valve closing is restrained and generation of particles is prevented. In the valve element 209, there is a gap created between the male threaded portion 291a and the female threaded portion 292a without exception, and there is a possibility that minute dirt or wastes get into the gap.

Namely, when a valve element is made up of two components, like the valve element 9, it is the most effective way of restraining particles to join the first component 91 and the second component 92 by insert molding. As for the valve elements 109 and 209, when the gap created between the first component 191 and the second component 192 and each gap created between the first component 291 and the second component 292 are filled with resin or the like, the same particle restraint effect with the valve element 9 can be expected. Alternatively, press-fitting or fastening by screws does not need a die for insert molding and is applicable to any shape of a valve element, achieving high versatility.

The present invention may be embodied in other various forms without being limited to the above mentioned embodiments.

(1) For example, in the above embodiments, the fluid control valve 1 is applied to a semiconductor manufacturing device, but as one alternative, the valve 1 may be applied to another device.

(2) For example, in the above embodiments, a valve part 410 is provided with a columnar part and a shoulder part, but as one alternative, the valve part 410 may be formed into a conical shape.

(3) For example, in the above embodiments, the fluid control valve 1 is constituted as a diaphragm valve, but as one alternative, the configuration of the annular sealing protrusion of the diaphragm valve element 4 may be applied to a valve element with no web portion such as a bellows valve or a solenoid valve to reduce a displacement amount of the annular sealing surface.

Figure 34:
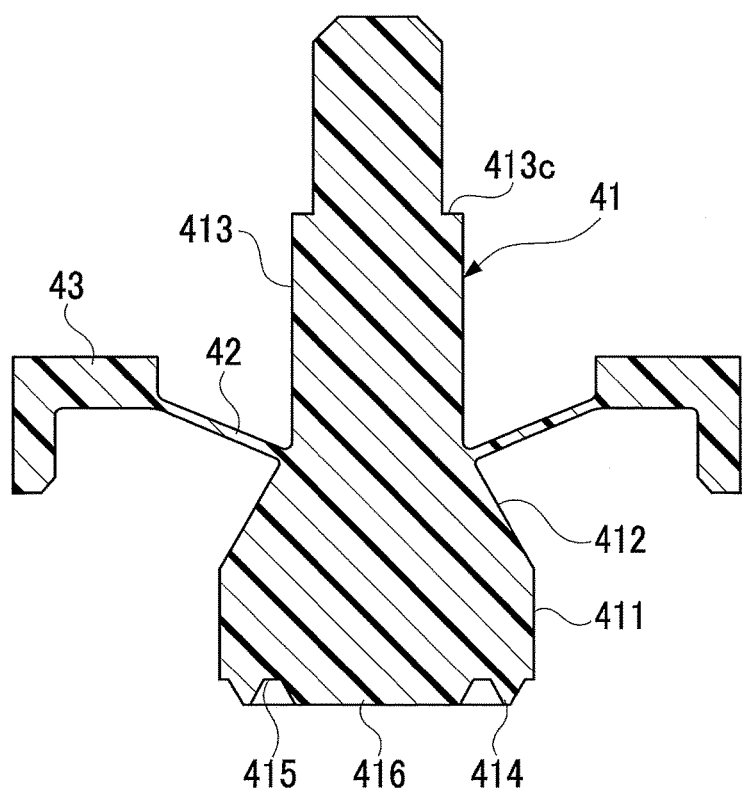
FIG. 34 is a sectional view showing a valve element in a third modified example.
Figure 35:
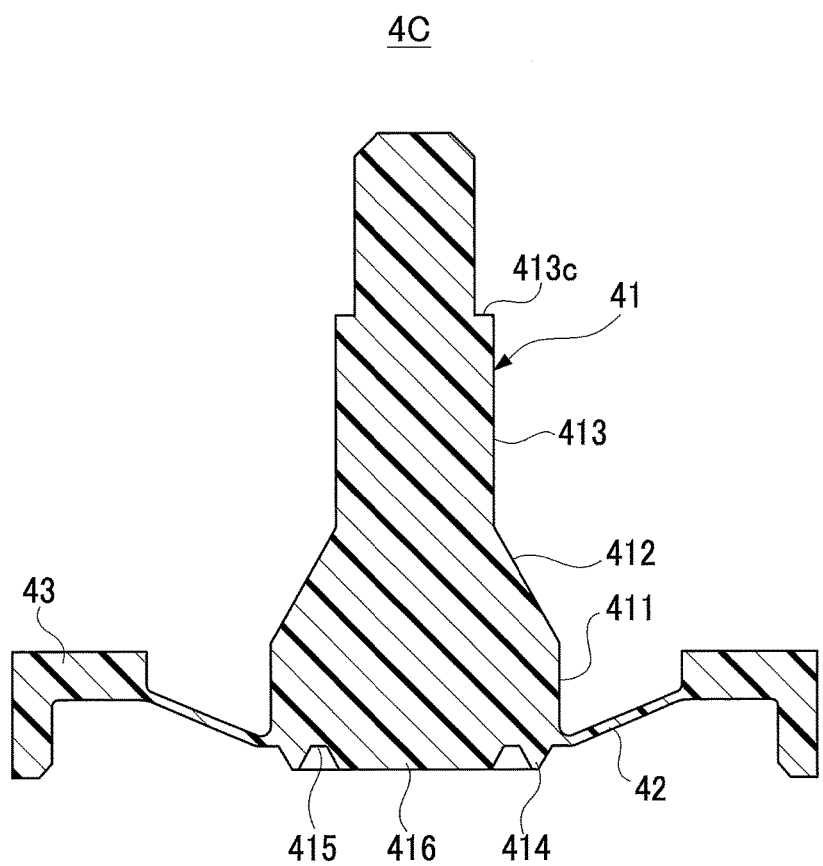
FIG. 35 is a sectional view showing a valve element in a fourth modified example.

(4) For example, in the above embodiments, the web portion 42 is connected to the neck part 413. As one alternative for this, the web portion 42 may be connected to a connecting point of the shoulder part 412 and the neck part 413 as indicated with a valve element 4B in a third modified example shown in FIG. 34. As another alternative, the web portion 42 may be connected to the columnar part 411 as indicated with a valve element 4C in a fourth modified example shown in FIG. 35.

(5) For example, in the above embodiments, the male threaded portion 413b of the diaphragm valve element 4 is threaded with the female threaded portion 35c of the drive section 3 to couple the diaphragm valve element 4 with the drive section 3. As one alternative for this, a valve element 4D in a fifth modified example shown in FIG. 36 may be coupled with the drive section 3 such that a female threaded portion 420 is formed in the neck part 413 and a male threaded portion to be threaded with the female thread portion 420 is provided in the piston 35 of the drive section 3.

(6) As one alternative, the diaphragm valve element 4 may be made of denatured P (denatured polytetrafluoroethylene) with hardness D 55 to D 60 or PFA (tetrafluoroethylene perfluoroalkylvinyl ether copolymer) with hardness D 60 to D 64.

(7) As one alternative, the body 21 (the valve seat 24) may be made of PTFE (polytetrafluoroethylene) with hardness D 53 to D 58, or denatured PIPE (denatured polytetrafluoroethylene) with hardness D 55 to D 60.

(8) As one alternative, the annular sealing surface 414a may be formed with chamfered edges or rounded edges. In this case, a diameter at a middle position of an inner periphery and an outer periphery of a flat surface corresponds to "a diameter of the annular sealing portion." Further, other than the flat part, the annular sealing surface 414a may be formed with a leading end part to be round-shaped. In this case, the diameter of the annular sealing protrusion 414 corresponds to a diameter of a top part of the annular sealing protrusion facing the valve seat. In this case, too, when the annular sealing protrusion 414 and its surroundings (for example, the diameter of the columnar part 411, the protrusion 416, and the annular recessed groove 415) are formed into a shape such that compression and deformation of the valve body 41 of the diaphragm valve element 4 is generated only in a vertical direction, the same operational effect can be obtained as the above embodiments.

(9) The bottom surface of the annular recessed groove 415 may have the height equal or almost equal to the height of the end face 411a.

(10) The end face 411a is not limited to a flat shape and may be a slanted or curved surface.

(11) The displacement amount of the annular sealing surface 414a to be restrained for preventing generation of particles is not limited to the displacement amount of the radially outward displacement, but may be a displacement amount of inward displacement.

(12) The annular sealing protrusion may be formed into a cylindrical shape and have a uniform thickness in a radial direction from a valve seat side to an opposite from the valve seat side.

(13) The annular sealing protrusion may have the different shapes in a wall shape on a side close to an axial core in a radial direction of the valve element and on a side opposite to the axial core in the radial direction of the valve element. The wall shape and the height of the protrusion may be designed to reduce the displacement amount of the annular sealing surface (the annular sealing protrusion).

(14) The value of D/A is not limited to the above embodiments and may be values such as 1.35, 1.40, and 1.45. As shown in FIG. 25, when the value of D/A becomes large, the displacement amount of the annular sealing surface 414a is decreased and generation of particles can be restrained.

REFERENCE SIGNS LIST

1 Fluid control valve
3 Drive section

4 Diaphragm valve element (one example of a valve element)
24 Valve seat
414 Annular sealing protrusion
414a Annular sealing surface (one example of an annular sealing portion)
415 Annular recessed groove
416 Protrusion
A Widthwise mean diameter of the annular sealing surface
B Radial width of the annular sealing surface
D Diameter of an end face
F Axial thickness at a center point of the annular sealing surface in the widthwise direction
H Diameter of a basal end part of the protrusion
I Height of the protrusion
J Diameter of a thin part between a pressure receiving surface on which the neck part receives a thrust force from the drive section and the end face

What is claimed is:

1. A fluid control valve, comprising:
a drive section;
a valve body provided with a first port, a second port, and a valve seat; and
a valve element which is columnar shaped and coupled with the drive section,
wherein the valve element includes an annular sealing protrusion annularly protruding from an end face located on a side facing the valve seat, the sealing protrusion being provided at a leading end with an annular sealing portion capable of being pressed against the valve seat for sealing, and at least the annular sealing protrusion is made of fluororesin,
wherein a diameter of the end face is 1.3 times or more than a diameter of the annular sealing portion when the annular sealing portion is out of contact with the valve seat,
wherein the valve element includes a thin part having a diameter smaller than a diameter of the annular sealing portion,
wherein the valve element includes a protrusion protruding from the end face toward the valve seat and in a position radially more inside than the annular sealing protrusion, and
wherein the protrusion has a basal end connected with the end face, the basal end having a diameter equal to or more than the diameter of the thin part of the valve element.

2. The fluid control valve according to claim 1, wherein the annular sealing protrusion is made of PFA.

3. The fluid control valve according to claim 2, wherein the valve main part is configured such that an axial thickness at a center point of the annular sealing protrusion is made to be 0.7 times or more than the diameter of the annular sealing portion.

4. The fluid control valve according to claim 1, wherein the valve main part is configured such that an axial thickness at a center point of the annular sealing protrusion is made to be 0.7 times or more than the diameter of the annular sealing portion.

* * * * *